(12) United States Patent
Mori

(10) Patent No.: US 11,711,606 B2
(45) Date of Patent: Jul. 25, 2023

(54) DISPLAY CONTROL APPARATUS, CONTROL METHOD FOR CONTROLLING THE SAME, AND STORAGE MEDIUM

(71) Applicant: CANON KABUSHIKI KAISHA, Tokyo (JP)

(72) Inventor: Naomi Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/677,349

(22) Filed: Feb. 22, 2022

(65) Prior Publication Data

US 2022/0272277 A1    Aug. 25, 2022

(30) Foreign Application Priority Data

Feb. 24, 2021   (JP) .................. 2021-027612

(51) Int. Cl.
*H04N 5/232*   (2006.01)
*H04N 23/63*   (2023.01)

(52) U.S. Cl.
CPC ......... *H04N 23/631* (2023.01); *H04N 23/635* (2023.01)

(58) Field of Classification Search
CPC ............. H04N 5/232; H04N 5/232933; H04N 5/232945
See application file for complete search history.

(56) References Cited

U.S. PATENT DOCUMENTS 8,913,004 B1 * 12/2014 Bozarth ............... G06F 1/3234
                                                                  348/78

FOREIGN PATENT DOCUMENTS

JP       H0588074 A   4/1993

* cited by examiner

*Primary Examiner* — Yogesh K Aggarwal
(74) *Attorney, Agent, or Firm* — Canon U.S.A., Inc. IP Division

(57) ABSTRACT

A display control apparatus includes an acquisition unit configured to acquire information regarding a line of sight of a user toward a display unit visually checked by the user through a viewfinder and a control unit configured to display on the display unit an image indicating, in a screen of the display unit, an effective display region in which a display element for calibration of the information is displayed. The control unit performs control so that the effective display region is displayed on the display unit based on any of a plurality of display settings including a first display setting for displaying the effective display region in a first size and a second display setting for displaying the effective display region in a second size smaller than the first size.

15 Claims, 16 Drawing Sheets

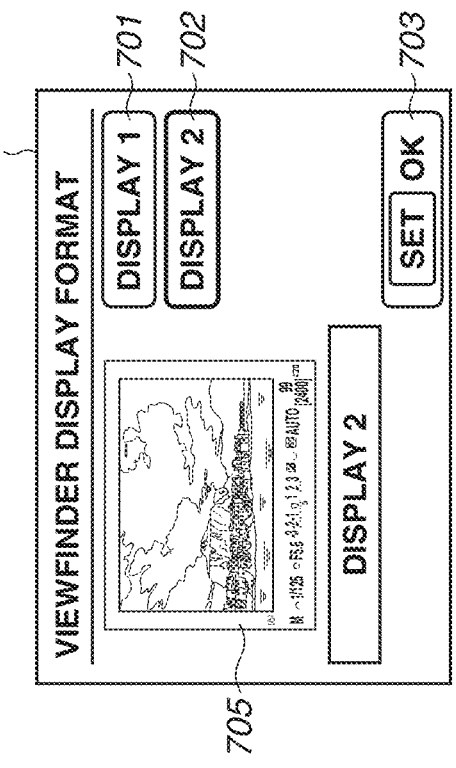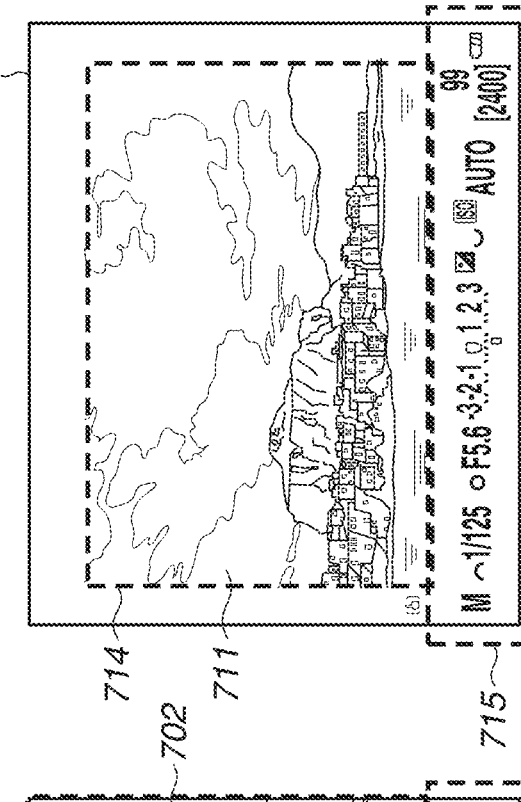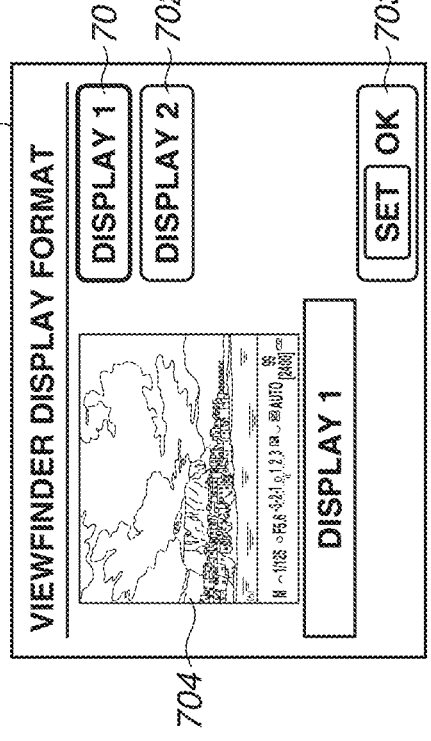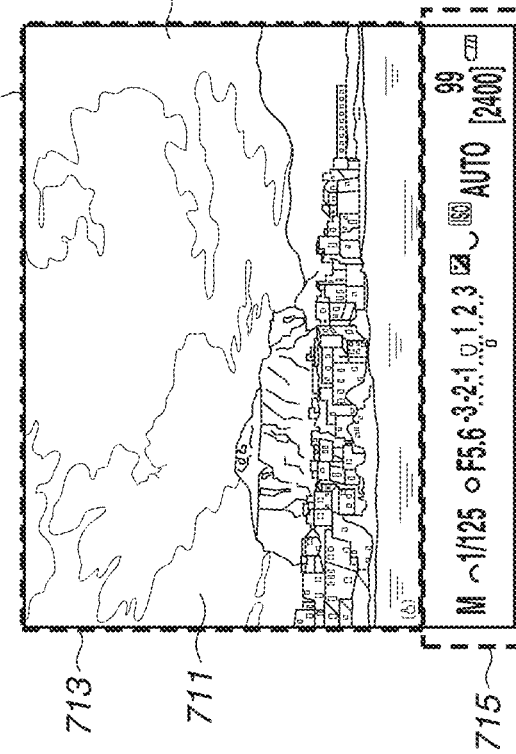

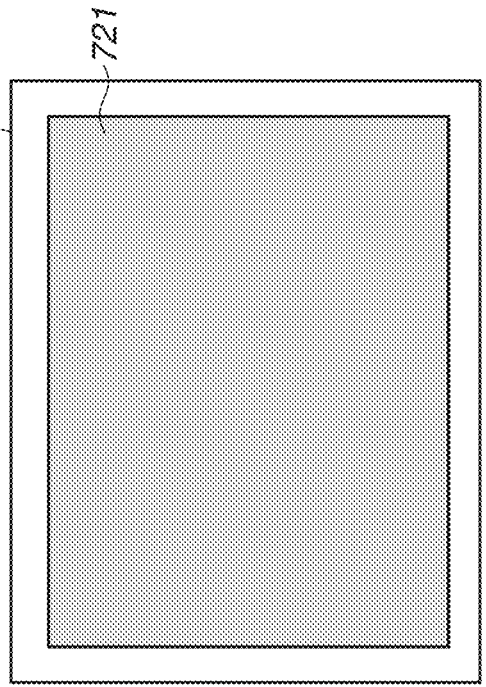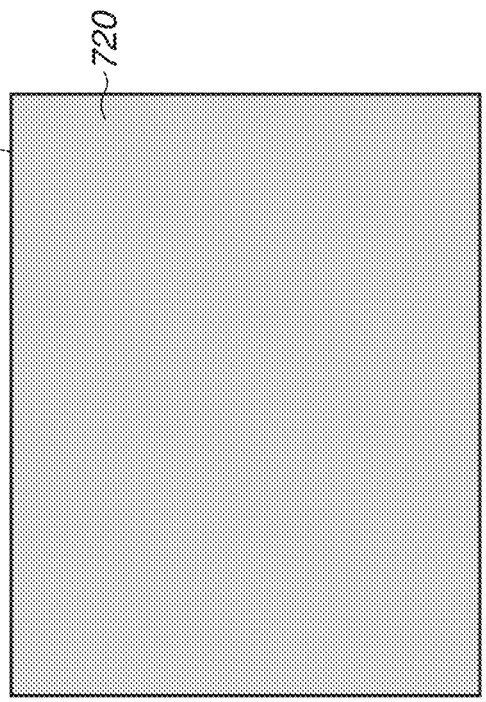

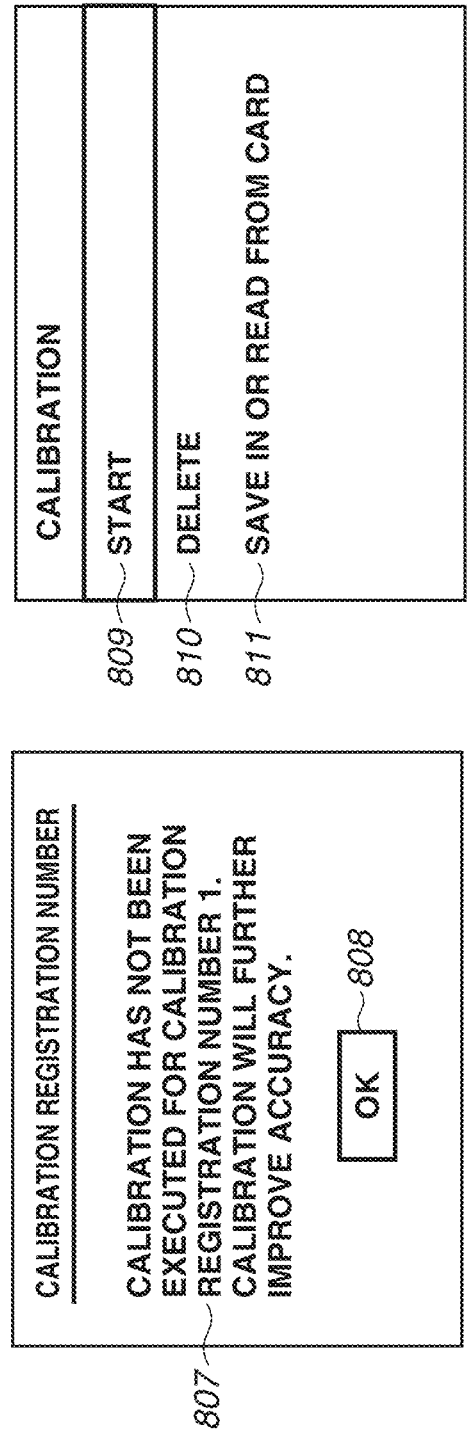

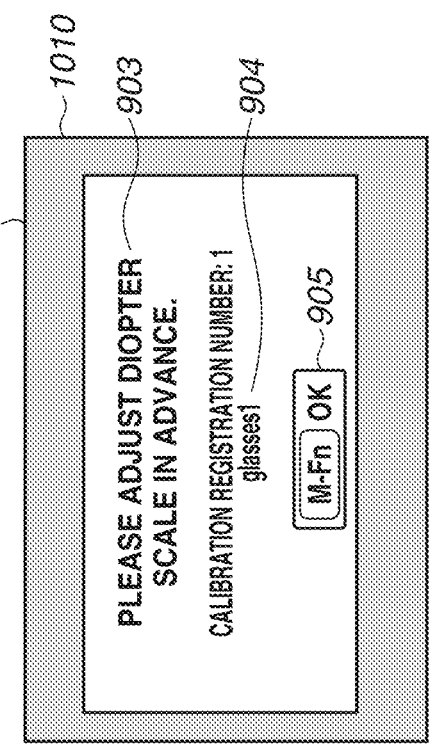
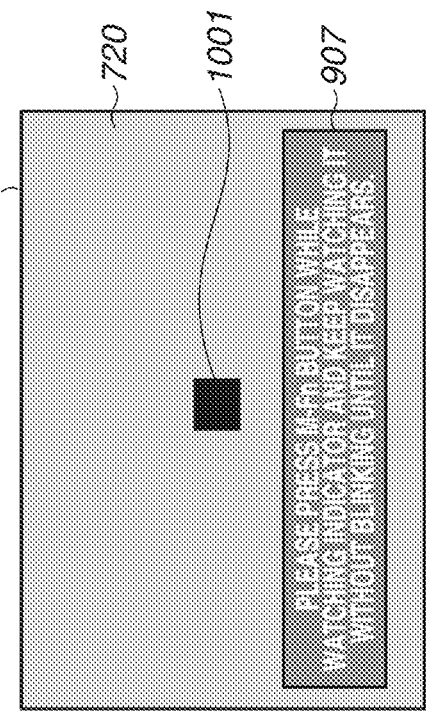
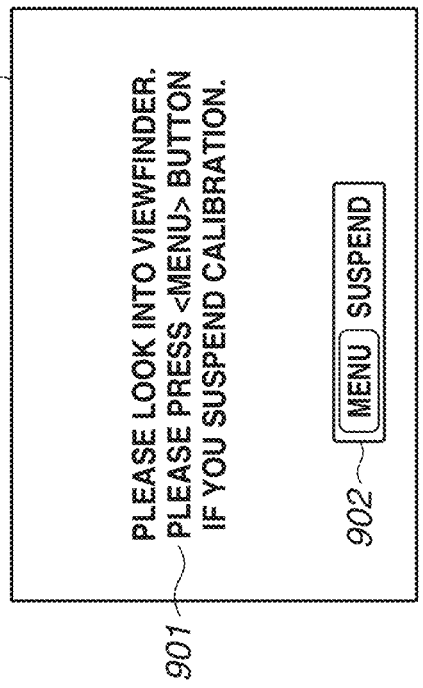
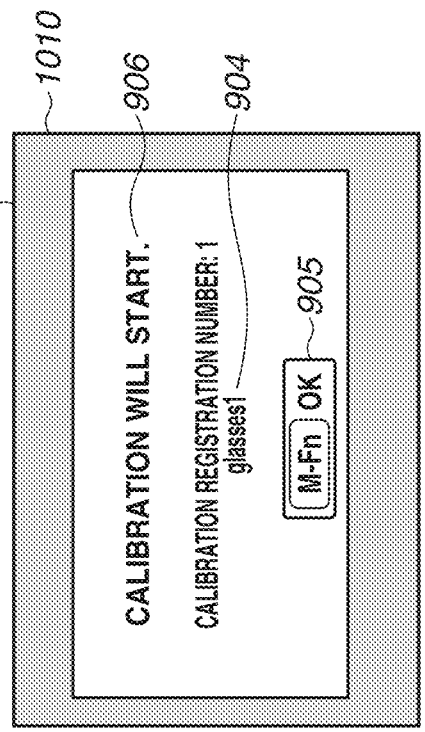

DISPLAY CONTROL APPARATUS, CONTROL METHOD FOR CONTROLLING THE SAME, AND STORAGE MEDIUM

BACKGROUND

Field of the Invention

Exemplary embodiments of the present disclosure relate to a display control apparatus that controls a display unit provided inside a viewfinder, a control method for controlling a display control apparatus, and a storage medium.

Description of the Related Art

Conventionally, the following camera is discussed. A camera detects the line-of-sight direction of a photographer (a user) who has looked into a display unit (an inside-viewfinder display unit) through a viewfinder, detects which region (position) in the field of view of the viewfinder the user observes, and controls an image capturing function such as automatic focus adjustment. The accuracy of the detection of the line-of-sight direction depends on the diameter of the pupil of the eye of the user, the direction and the position in and at which the user looks into the viewfinder, and/or the brightness of the surroundings. Thus, it is necessary to perform line-of-sight calibration for acquiring a line-of-sight position as data and correcting the line-of-sight position based on the acquired data, to improve the accuracy of the detection. The publication of Japanese Patent Application Laid-Open No. 05-88074 discusses a method for displaying in a single color an effective display region indicating a range in which a gaze target to be displayed on an inside-viewfinder display unit in performing line-of-sight calibration is displayed.

In the publication of Japanese Patent Application Laid-Open No. 05-88074, however, in a case where a user wearing glasses views the inside-viewfinder display unit, the user may not be able to check the entirety of the effective display region in the inside-viewfinder display unit as much as in a case where the user does not wear glasses. In particular, in a case where the user cannot visually check the entirety of the effective display region in the inside-viewfinder display unit during the calibration, the user may change the direction in which the user looks into the viewfinder to visually check a region that cannot be visually checked. A change in the positional relationship between a line-of-sight detector placed in the viewfinder and the eye may lead to the acquisition of calibration data with low accuracy and also decrease the accuracy of line-of-sight detection.

SUMMARY

Exemplary embodiments are directed to enabling a user to appropriately visually check an effective display region and a display element displayed in the effective display region.

According to an aspect of the present disclosure, a display control apparatus includes an acquisition unit configured to acquire information regarding a line of sight of a user toward a display unit visually checked by the user through a viewfinder and a control unit configured to display on the display unit an image indicating, in a screen of the display unit, an effective display region in which a display element for calibration of the information is displayed. The control unit performs control so that the effective display region is displayed on the display unit based on any of a plurality of display settings including a first display setting for displaying the effective display region in a first size and a second display setting for displaying the effective display region in a second size smaller than the first size.

Further features of the present disclosure will become apparent from the following description of exemplary embodiments with reference to the attached drawings.

BRIEF DESCRIPTION OF THE DRAWINGS

FIGS. 7A-1 to 7C-2 illustrate examples of display performed on an inside-viewfinder display unit (an electronic viewfinder (EVF)).

FIGS. 8A to 8F illustrate examples of display of setting menu screens regarding the line-of-sight input function in the menu mode process.

FIGS. 9A to 9G illustrate examples of display of screens displayed on the EVF or a display unit in the calibration process regarding a line of sight.

FIGS. 10A-1 to 10E-2 illustrate examples of display of screens displayed on the EVF in the line-of-sight data registration process.

DESCRIPTION OF THE EMBODIMENTS

Exemplary embodiments of the present disclosure will be described below with reference to the drawings.

Figure 1A:
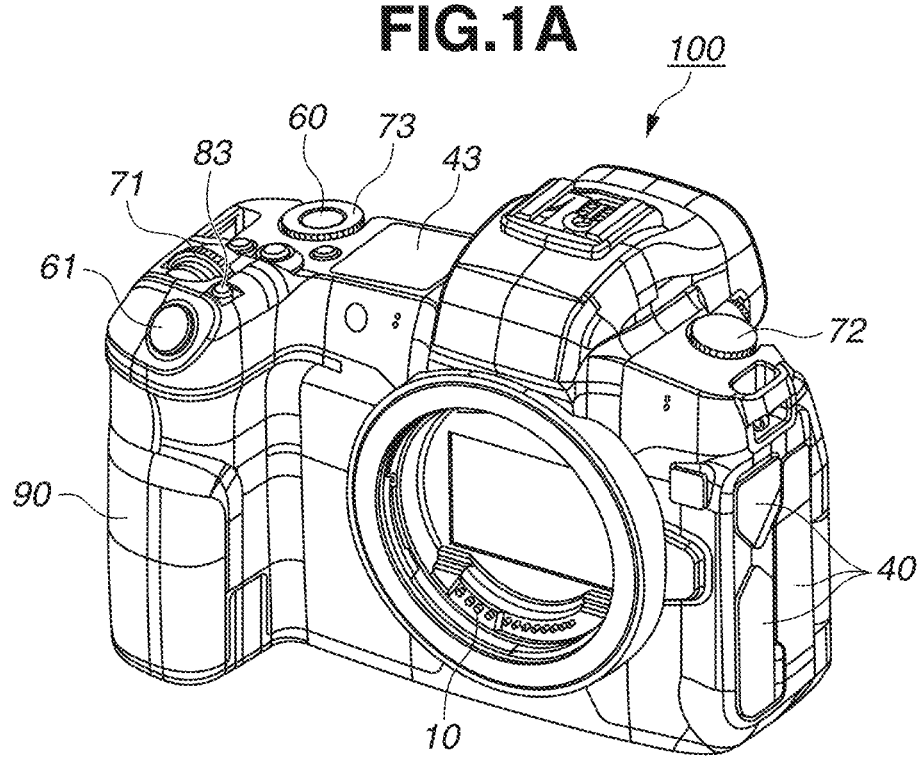
FIGS. 1A and 1B are external views of a digital camera.
Figure 1B:
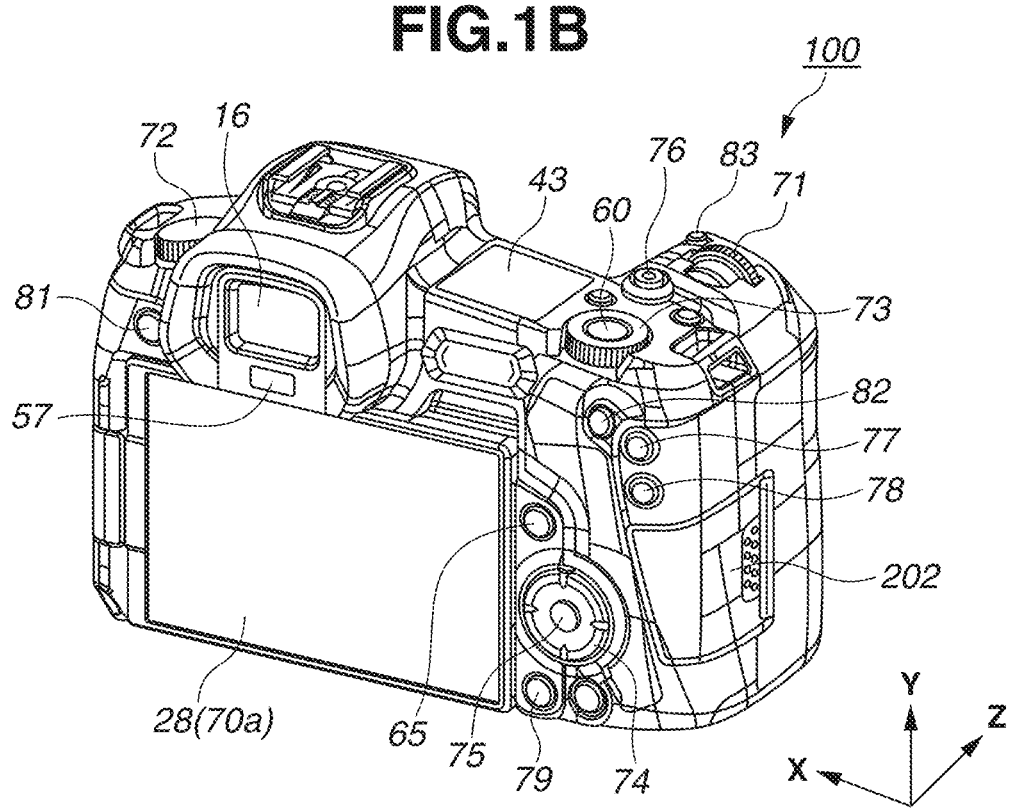

FIGS. 1A and 1B illustrate external views of a digital camera 100 as an example of an apparatus to which the present exemplary embodiment is applicable. FIG. 1A is a front perspective view of the digital camera 100. FIG. 1B is a rear perspective view of the digital camera 100. In FIGS. 1A and 1B, a display unit 28 is provided on the back surface of the digital camera 100 and displays an image and various pieces of information. A touch panel 70a is an operation member which enables a touch operation. The touch panel 70a can detect a touch operation performed on a display surface (an operation surface) of the display unit 28. An outside-viewfinder display unit 43 is provided outside a viewfinder of the digital camera 100 and displays various setting values of the digital camera 100, such as the setting values of a shutter speed and an aperture.

A shutter button 61 is an operation unit for providing an image capturing instruction. A mode selection switch 60 is an operation unit for switching various modes. A terminal cover 40 is used to protect a connector (not illustrated) for connecting a connection cable for an external device and the digital camera 100.

A main electronic dial 71 is a rotary operation member included in an operation unit 70. The main electronic dial 71 is rotated, so that the setting value of the shutter speed or the aperture can be changed. A power switch 72 is an operation member for switching the powering on and off of the digital camera 100. A sub electronic dial 73 is a rotary operation member included in the operation unit 70 and enables the movement of a selection frame or image advancement.

A directional pad 74 is an operation member included in the operation unit 70 and including a push button that can be pushed-in in four directions. The directional pad 74 enables an operation in accordance with the direction in which the directional pad 74 is pressed. A SET button 75 is a push button included in the operation unit 70 and is mainly used to determine a selection item. A moving image button 76 is used to provide an instruction to start or stop the capturing (recording) of a moving image. An AF-ON button 77 is included in the operation unit 70. In response to the AF-ON button 77 being pressed, an autofocus (AF) operation is started. Although the AF operation is started mainly by the shutter button 61 being pressed, an instruction to start the AF operation can be provided also by the AF-ON button 77 being pressed. In the digital camera 100 in which a setting can be made so that the AF operation is not performed by the shutter button 61 being pressed, an AF start instruction and an image capturing instruction can be separated from each other. After an automatic exposure (AE) lock button 78 is pressed, and if the shutter button 61 is pressed, an image can be captured with an AF position fixed, or an image can be captured even in a situation where AF cannot be performed.

The AF-ON button 77 is included in the operation unit 70. The AF-ON button 77 is pressed in an image capturing standby state (the state where the digital camera 100 starts capturing an image using an image capturing unit 22 in an image capturing mode and waits in an image capturing mode where an image capturing preparation and the like is not made), so that an exposure state can be fixed. That is, an image can be captured with a fixed exposure value desired by a user. A reproduction button 79 is an operation button included in the operation unit 70 and used to switch an image capturing mode and a reproduction mode. The reproduction button 79 is pressed in the image capturing mode, so that the image capturing mode transitions to the reproduction mode, and the most recent image among images recorded in a recording medium 200 can be displayed on the display unit 28.

A menu button 81 is included in the operation unit 70. The menu button 81 is pressed, so that a menu screen in which various settings can be made is displayed on the display unit 28. A multi-controller 65 is an operation member including a direction key that can be operated in eight directions and a push button that can be pushed in. The multi-controller 65 enables an operation in accordance with the direction in which the multi-controller 65 is tilted. The user can intuitively make various settings using the directional pad 74, the SET button 75, and the multi-controller 65 on the menu screen displayed on the display unit 28.

A line-of-sight finalization button 82 is an operation member included in the operation unit 70 and is a push button used to provide an instruction to execute or cancel the selection of an object based on the position of a pointer (to be described below). The line-of-sight finalization button 82 is arranged at a position at which it is easy for the user to operate the line-of-sight finalization button 82 even in the state where the user looks into the viewfinder (the state where the eye of the user is in proximity to an eyepiece portion 16) and the line-of-sight finalization button 82 can be operated with the thumb of the right hand holding a grip portion 90. An M-Fn button 83 is included in the operation unit 70 and used to quickly change various settings, such as the white balance and the International Organization for Standardization (ISO) sensitivity, by being pressing in an image capturing standby state.

The M-Fn button 83 can be used for a finalization operation for finalizing a viewpoint during line-of-sight calibration.

The operation unit 70 is various operation members serving as an input unit that receives operations from the user.

The operation unit 70 includes a push button, a rotating dial, and a touch sensor and includes at least operation members, such as the shutter button 61, the touch panel 70a, the main electronic dial 71, the power switch 72, the sub electronic dial 73, the directional pad 74, the SET button 75, the moving image button 76, the AF-ON button 77, the AE lock button 78, the reproduction button 79, the menu button 81, the line-of-sight finalization button 82, the M-Fn button 83, the multi-controller 65, a stop-down button 84, and a framing assist button.

Regarding a line-of-sight finalization function of updating an AF frame to a position based on a line-of-sight position (described below), a dedicated button having the line-of-sight finalization function may be provided in the digital camera 100, or the line-of-sight finalization function may be assigned to an operation member having another function. Examples of the operation member to which the line-of-sight finalization function can be assigned include the AF-ON button 77, the AE lock button 78, the multi-controller 65 (which is pushed in), the M-Fn button 83, the stop-down button 84, and the framing assist button.

The AF-ON button 77, the AE lock button 78, the multi-controller 65, and the M-Fn button 83 are each arranged at the position at which the user can operate the operation member without affecting the capturing of an image while operating the shutter button 61 with their right index finger. Specifically, the AF-ON button 77, the AE lock button 78, and the multi-controller 65 are arranged at the positions to be described below. In a case where the user holds the grip portion 90 with their right hand, the operation member is placed on the upper side (the shutter button 61 side) of the center position of a back surface portion of the digital camera 100, which corresponds to the opposite side of an object, and the right side (the grip portion 90 side) of an electronic viewfinder (EVF) 29. In a case where the user holds the grip portion 90 with their right hand, the M-Fn button 83 is located on a surface different from a surface facing the object and the back surface portion of the digital camera 100. In other words, the M-Fn button 83 is placed to the right side (the grip portion 90 side) of the EVF 29 and on a surface in an upper portion of the digital camera 100 (a surface on which the outside-viewfinder display unit 43 is placed).

The operation member is placed not only in the back surface portion of the digital camera 100 as long as the user can operate the operation member while operating the shutter button 61. For example, the operation member may be an operation member arranged in a front surface portion (on the object side) or a lens unit 150, such as the stop-down button 84 or the framing assist button. In this case, the arrangement position of the operation member is not limited to the back surface of the digital camera 100, and the operation member only needs to be arranged at the position at which the user can operate the operation member with a finger other than their right index finger operating the shutter button 61. The operation member to which the line-of-sight finalization function is assignable by the user and which has another function is a button having the function of not transitioning from the image capturing mode even if the button is operated during an operation on the shutter button 61, or is a button having the function of not hindering the execution of an image capturing function according to an operation on the shutter button 61. Alternatively, the operation member may be a button to which various functions can be assigned and which can be pressed. The operation member may be not only a push button, but also an operation bar that can be operated to the left and right, or a ring that can be rotationally operated. Or if the touch panel 70a, which is capable of detecting a pressing force (described below), is pushed in by strong pressing, the function may be started.

The grip portion 90 is a holding portion having a shape that makes it easy for the user to grip the holding portion with their right hand when the user holds up the digital camera 100. The shutter button 61 and the main electronic dial 71 are arranged at the positions at which the user can operate the shutter button 61 and the main electronic dial 71 with their right index finger in the state where the user holds the digital camera 100 by gripping the grip portion 90 with their right little, ring, and middle fingers. The sub electronic dial 73 is arranged at the position at which the user can operate the sub electronic dial 73 with their right thumb in a similar state.

A communication terminal 10 is a communication terminal for the digital camera 100 to communicate with the lens unit 150, which is attachable to and detachable from the digital camera 100 (described below).

The eyepiece portion 16 is an eyepiece portion of an eyepiece viewfinder (a look-in type viewfinder or a viewing window). The user can visually check a video displayed on the EVF 29, which is an inside-viewfinder display unit, through the eyepiece portion 16. In other words, the user looks into the EVF 29 through the viewfinder with their eye in proximity to the eyepiece portion 16 so that the user can visually check a video displayed on the EVF 29. An eye proximity detection unit 57 is an eye proximity detection sensor that detects whether the eye of the user is in proximity to the eyepiece portion 16. A cover 202 is a cover of a slot in which the recording medium 200 is stored.

Figure 2:
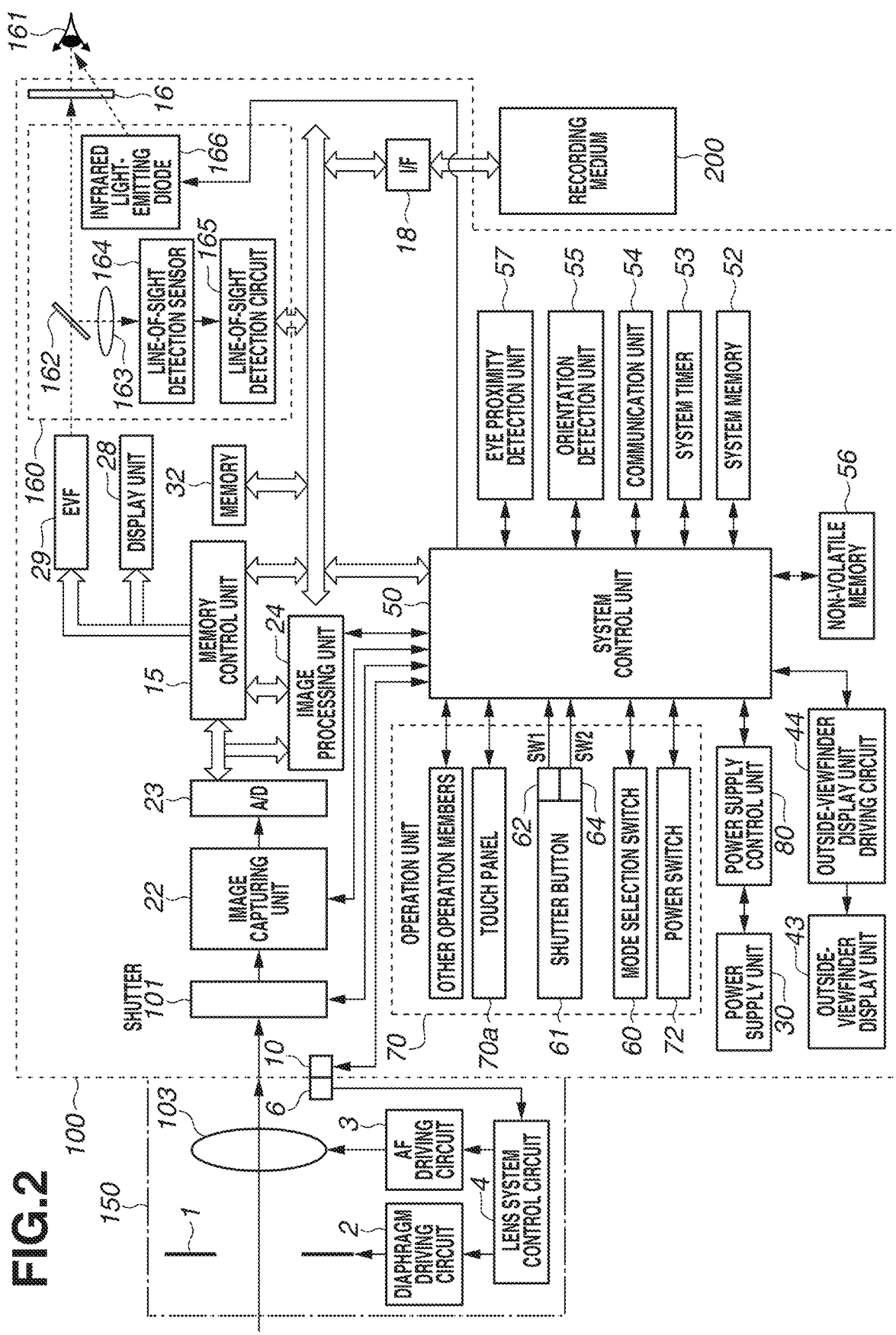
FIG. 2 is a block diagram illustrating a configuration of the digital camera.

FIG. 2 is a block diagram illustrating an example of the configuration of the digital camera 100 according to the present exemplary embodiment. In FIG. 2, the lens unit 150 is a lens unit on which an interchangeable imaging lens is mounted. Although a lens 103 normally includes a plurality of lenses, FIG. 2 illustrates only a single lens in a simplified manner. A communication terminal 6 is used for the lens unit 150 to communicate with the digital camera 100. The lens unit 150 communicates with a system control unit 50 via the communication terminals 6 and 10 and causes a lens system control circuit 4 inside the lens unit 150 to control a diaphragm 1 via a diaphragm driving circuit 2. Subsequently, the lens unit 150 displaces the lens 103 via an AF driving circuit 3, thus bringing the lens 103 into focus.

A shutter 101 is a focal-plane shutter capable of freely controlling the exposure time of the image capturing unit 22 under control of the system control unit 50.

The image capturing unit 22 is an image sensor configured by a charge-coupled device (CCD) sensor or a complementary metal-oxide-semiconductor (CMOS) sensor, which converts an optical image into electric signals. An analog-to-digital (A/D) converter 23 is used to convert an analog signal output from the image capturing unit 22 into a digital signal.

An image processing unit 24 performs predetermined processes such as a resizing process such as pixel interpolation and reduction, and a color conversion process on data from the A/D converter 23 or data from a memory control unit 15 (described below).

The image processing unit 24 performs a predetermined calculation process using captured image data. The system control unit 50 performs exposure control and distance measurement control based on a calculation result obtained by the image processing unit 24. Thus, an AF process, an AE process, and a pre-flash (EF) process based on a through-the-lens (TTL) method are performed. The image processing unit 24 further performs a predetermined calculation process using the captured image data and performs an auto white balance (AWB) process using the TTL method based on the obtained calculation result.

The memory control unit 15 controls the transmission and reception of data between the A/D converter 23, the image processing unit 24, and a memory 32. Output data from the A/D converter 23 is written directly to the memory 32 via the image processing unit 24 and the memory control unit 15 or via the memory control unit 15. The memory 32 stores therein image data that has been obtained by the image capturing unit 22 and has been converted into digital data by the A/D converter 23 and image data to be displayed on the display unit 28 or the EVF 29. The memory 32 has a sufficient storage capacity for storing a predetermined number of still images and a moving image and a sound of a predetermined length of time.

The memory 32 also serves as a memory for image display (a video memory). Image data for display written in the memory 32 is displayed on the display unit 28 or the EVF 29 via the memory control unit 15. The display unit 28 and the EVF 29 perform display on a display device, such as a liquid crystal display (LCD) or an organic electroluminescent (EL) display, in accordance with a signal from the memory control unit 15. Data that has been converted from analog data to digital data by the A/D converter 23 and has been accumulated in the memory 32 is sequentially transferred to and displayed on the display unit 28 or the EVF 29, so that the display unit 28 or the EVF 29 can perform live view display (LV display). Hereinafter, an image displayed in live view will be referred to as a "live view image (LV image)".

An infrared light-emitting diode 166 is a light-emitting element for detecting the line of sight of the user on a screen in the viewfinder and emits infrared light to an eyeball (eye) 161 of the user. The infrared light emitted from the infrared light-emitting diode 166 is reflected by the eyeball (eye) 161, and the reflected infrared light reaches a dichroic mirror 162. The dichroic mirror 162 reflects only infrared light and transmits visible light therethrough. The reflected infrared light of which the optical path is changed forms an image on the imaging surface of a line-of-sight detection sensor 164 through an imaging lens 163. The imaging lens 163 is an optical member included in a line-of-sight detection optical system. The line-of-sight detection sensor 164 includes an imaging device such as a CCD image sensor.

The line-of-sight detection sensor 164 photoelectrically converts the reflected infrared light incident on the line-of-sight detection sensor 164 into an electric signal and outputs the electric signal to a line-of-sight detection circuit 165. The line-of-sight detection circuit 165 includes at least one processor. The line-of-sight detection circuit 165 detects the line of sight of the user from the image or the motion of the eyeball (eye) 161 of the user based on the output signal of the line-of-sight detection sensor 164, and outputs detection information to the system control unit 50. Thus, a line-of-sight detection block 160 includes the dichroic mirror 162, the imaging lens 163, the line-of-sight detection sensor 164, the infrared light-emitting diode 166, and the line-of-sight detection circuit 165. The line-of-sight detection block 160 is one of reception units that receive a line-of-sight input.

In the present exemplary embodiment, the line of sight is detected by a method termed a corneal reflection method, using the line-of-sight detection block 160. In the corneal reflection method, the motion of the eye of the user is detected based on the positional relationship between reflected light obtained by particularly the cornea of the eyeball (eye) 161 reflecting infrared light emitted from the infrared light-emitting diode 166, and the pupil of the eyeball (eye) 161, and the direction of the eye (the line of sight) of the user is detected. There are also various other methods for detecting the line of sight, such as a method termed a scleral reflection method in which a difference in reflectance of light between the iris of the eye and the white of the eye is used. Any line-of-sight detection methods by which the line of sight is detectable may be used instead of the foregoing methods.

The outside-viewfinder display unit 43 displays various setting values of the digital camera 100, such as the setting values of the shutter speed and the stop, via an outside-viewfinder display unit driving circuit 44. Unlike the display unit 28 or the EVF 29, the outside-viewfinder display unit 43 does not display an LV image.

A non-volatile memory 56 is an electrically erasable and recordable memory. As the non-volatile memory 56, for example, a flash read-only memory (ROM) is used. The non-volatile memory 56 stores therein a constant for the operation of the system control unit 50 and a program. The "program" as used herein refers to a program for executing various processes in flowcharts described below in the present exemplary embodiment.

The system control unit 50 is a control unit including at least one processor or circuit and controls the entirety of the digital camera 100. The system control unit 50 executes the above program recorded in the non-volatile memory 56 to implement processes described later in the present exemplary embodiment. As a system memory 52, for example, a random-access memory (RAM) is used. A constant and a variable for the operation of the system control unit 50 and the program read from the non-volatile memory 56 are loaded into the system memory 52. The system control unit 50 also controls the memory 32 and the display unit 28, thus performing display control.

A system timer 53 is a time measurement unit that measures the time used for various types of control and the time of a built-in clock.

The mode selection switch 60 is an operation member included in the operation unit 70 and is used to switch the operation mode of the system control unit 50 to either of a still image capturing mode and a moving image capturing mode. The still image capturing mode includes an auto image capturing mode, an auto scene determination mode, a manual mode, a aperture priority mode (an Av mode), a shutter speed priority mode (a Tv mode), and a program AE mode (a P mode). The still image capturing mode also includes various scene modes in which image capturing settings are made based on image capturing scenes, and a custom mode. Using the mode selection switch 60, the user can directly switch to any one of these modes. Alternatively, using the mode selection switch 60, the user may once switch to a list screen of image capturing modes, then select any one of a plurality of modes displayed on the list screen, and switch to the selected mode using another operation member. Similarly, the moving image capturing mode may also include a plurality of modes.

A first shutter switch 62 is turned on partway through an operation on the shutter button 61 of the digital camera 100, i.e., by a half press (an image capturing preparation instruction), and generates a first shutter switch signal SW1. In response to the first shutter switch signal SW1, the system control unit 50 starts an image capturing preparation operation, such as an AF process, an AE process, an AWB process, and an EF process.

A second shutter switch 64 is turned on by the completion of an operation, i.e., by a full press (an image capturing instruction), on the shutter button 61 and generates a second shutter switch signal SW2. In response to the second shutter switch signal SW2, the system control unit 50 starts a series of operations of an image capturing process from the reading of a signal from the image capturing unit 22 to the writing of a captured image as an image file to the recording medium 200. If the on state of the second shutter switch 64 is continued, the digital camera 100 performs continuous image capturing at a speed depending on the speed determined in advance at which images can be continuously captured.

A power supply control unit 80 includes a battery detection circuit, a direct-current-to-direct-current (DC/DC) converter, and a switch circuit for switching blocks to which to apply a current. The power supply control unit 80 detects the presence or absence of attachment of a battery, the type of the battery, and the remaining life of the battery. The power supply control unit 80 controls the DC/DC converter based on the detection results and an instruction from the system control unit 50 and supplies a sufficient voltage to the components including the recording medium 200 for a sufficient period. A power supply unit 30 includes a primary battery, such as an alkaline battery and a lithium battery, a secondary battery such as a nickel-cadmium (NiCd) battery, a nickel-metal hydrate (NiMH) battery, or a lithium-ion (Li) battery, or an alternating current (AC) adapter.

A recording medium interface (I/F) 18 is an interface with the recording medium 200, such as a memory card and a hard disk. The recording medium 200 is a recording medium, such as a memory card, for recording a captured image and includes a semiconductor memory or a magnetic disk.

A communication unit 54 connects to an external device wirelessly or via a cable for a wired connection, and transmits and receives a video signal and a sound signal to and from the external device. The communication unit 54 is also connectable to a wireless local area network (LAN) or the Internet. The communication unit 54 can communicate with the external device also using Bluetooth® or Bluetooth® Low Energy. The communication unit 54 can transmit an image (including a live view image) captured by the image capturing unit 22 or an image stored in the recording medium 200 to the external device and also receive an image or various other pieces of information from the external device.

An orientation detection unit 55 detects the orientation (attitude) of the digital camera 100 relative to the direction of gravity.

On the basis of the orientation detected by the orientation detection unit 55, the system control unit 50 can determine whether an image captured by the image capturing unit 22 is an image captured with the digital camera 100 held up horizontally or an image captured with the digital camera 100 held up vertically. The system control unit 50 can add attitude information according to the orientation detected by the orientation detection unit 55 to an image file of an image captured by the image capturing unit 22 and store the image rotated based on the orientation detected by the orientation detection unit 55. An acceleration sensor and a gyro sensor may be used as the orientation detection unit 55. Using the acceleration sensor and/or the gyro sensor as the orientation detection unit 55, the system control unit 50 can also detect the motion of the digital camera 100 (whether the digital camera 100 is panned, tilted, lifted, or at rest).

The eye proximity detection unit 57 is an eye proximity detection sensor that detects the approach (eye proximity) and the separation (eye separation) of the eye (a physical body) 161 to and from the eyepiece portion 16 of the viewfinder (such a detection may be referred to as approach detection). According to a state detected by the eye proximity detection unit 57, the system control unit 50 switches showing and hiding (a display state and a non-display state) the display unit 28 and the EVF 29. More specifically, in a case where at least the digital camera 100 is in an image capturing standby state, and the switching setting of the display destination for a live view image captured by the image capturing unit 22 is an automatic switching setting, and while the eye is not in proximity, the display destination is set to the display unit 28, the display of the display unit 28 is turned on, and the EVF 29 is set to the non-display state.

While the eye is in proximity, the display destination is set to the EVF 29, the display of the EVF 29 is turned on, and the display unit 28 is set to the non-display state. As the eye proximity detection unit 57, for example, an infrared proximity sensor can be used. The eye proximity detection unit 57 can detect the approach of some kind of physical body to the eyepiece portion 16 of the viewfinder having the EVF 29 built-in. If a physical body approaches, infrared light projected from a light projection portion (not illustrated) of the eye proximity detection unit 57 is reflected by the physical body. The reflected infrared light is then received by a light reception portion (not illustrated) of the infrared proximity sensor. The amount of the received infrared light enables determination of the distance of the approaching physical body from the eyepiece portion 16 (an eye proximity distance). As described above, the eye proximity detection unit 57 performs eye proximity detection for detecting the proximity distance of a physical body from the eyepiece portion 16.

In the present exemplary embodiment, the light projection portion and the light reception portion of the eye proximity detection unit 57 are devices separate from the infrared light-emitting diode 166 and the line-of-sight detection sensor 164. The infrared light-emitting diode 166, however, may also serve as the light projection portion of the eye proximity detection unit 57. The line-of-sight detection sensor 164 may also serve as the light reception portion.

In a case where, in a non-eye proximity state (a non-approach state), a physical body approaching the eyepiece portion 16 within a predetermined distance from the eyepiece portion 16 is detected, it is detected that the eye is in proximity. In a case where, in an eye proximity state (an approach state), a physical body of which the approach has been detected separates from the eyepiece portion 16 at a predetermined distance or more, it is detected that the eye separates. A threshold for detecting eye proximity and a threshold for detecting eye separation may be different by, for example, providing hysteresis. After eye proximity is detected, it is assumed that the eye proximity state continues until eye separation is detected. After eye separation is detected, it is assumed that the non-eye proximity state continues until eye proximity is detected. The infrared proximity sensor is merely an example, and other sensors that can detect the approach of the eye or a physical body that can be regarded as eye proximity may be employed as the eye proximity detection unit 57.

The system control unit 50 can detect the following operations or states based on output from the line-of-sight detection block 160.

The state where the line-of-sight detection block 160 detects the line of sight of the user whose eye is in proximity to the eyepiece portion 16, i.e., the state where a line-of-sight input is provided.

The state where the line-of-sight detection block 160 detects the line of sight of the user whose eye is in proximity to the eyepiece portion 16, and the user gazes (described below).

The state where the line-of-sight detection block 160 ceases to detect the line of sight of the user whose eye is in proximity to the eyepiece portion 16 after detecting the line of sight, i.e., the state where a line-of-sight input is completed.

The state where the line-of-sight detection block 160 does not detect the line of sight of the user whose eye is in proximity to the eyepiece portion 16, i.e., the state where a line-of-sight input is not provided.

The above state where the user gazes refers to a case where the line-of-sight detection block 160 locates a position (a line-of-sight position) on the EVF 29 based on the detected line of sight and determines that the located line-of-sight position does not exceed a predetermined amount of movement within a predetermined time.

Examples of the state where a line-of-sight input ends include a case where the user separates their eye from the eyepiece portion 16, and a case where the eye 161 of the user cannot be detected due to the closing of the eyelid although the eye continues to be in proximity to the eyepiece portion 16.

Line-of-sight calibration is a calibration step for detecting the line of sight of the user using the line-of-sight detection block 160, and more accurately determining a line-of-sight position corresponding to the line of sight of the user. The line-of-sight detection block 160 can detect the line of sight of the user without performing calibration and determine a line-of-sight position corresponding to the line of sight. However, the entire structure of the human eye including the eyelid varies from individual to individual, and it may be difficult to determine a line-of-sight position corresponding to the line of sight of some user. Performing of the line-of-sight calibration enables acquisition of line-of-sight data which is line-of-sight information specific to the user who uses the digital camera 100. A calibration value is calculated from the acquired line-of-sight data specific to the user, thus enabling further accurate determination of a line-of-sight position corresponding to the line of sight input by the user.

In a case where it is assumed that line-of-sight detection is performed in various orientations as in the digital camera 100 according to the present exemplary embodiment, the positional relationship between the EVF 29 of the digital camera 100 and the eye 161, i.e., the relative positional relationship between the line-of-sight detection block 160 and the eye 161, may change. In such a case, it is desirable to perform the line-of-sight calibration in each of a case where the digital camera 100 is vertically oriented and a case where the digital camera 100 is horizontally oriented. If the line-of-sight position of the user is calculated based on a calibration value in each orientation, it is possible to minimize the shift between a position viewed by the user and a detected line-of-sight position.

In the present exemplary embodiment, if the digital camera 100 has already executed the line-of-sight calibration (has already acquired calibration data) in either one of the horizontal and vertical orientations, it is possible to perform line-of-sight detection with somewhat high accuracy using the acquired calibration data (described below).

In the line-of-sight calibration, a plurality of gaze points is displayed at positions different from each other. These gaze points are indicators indicating positions at which the user is expected to gaze when the calibration is performed, and are display elements. Line-of-sight data of the user when the user gazes at each gaze point (described below) is acquired and accumulated, and a calibration value is calculated from the plurality of pieces of line-of-sight data. The display positions of the plurality of gaze points are made greatly different from each other at this time, and pieces of line-of-sight data of the eyeball at various angles are acquired. For example, the gaze points are displayed at positions greatly different from each other in up, down, left, and right directions (at a large height and a large width) in an effective display region, thus acquiring a plurality of pieces of line-of-sight data greatly different from each other in the motion and the angle of the eyeball of the user. Thus, regardless of the motion and the angle of the eyeball of the user viewing the display unit 28 (the EVF 29), a calibration value can be calculated from the acquired pieces of line-of-sight data. In other words, the gaze points are displayed at positions at which the eye 161 of the user is moved largely to the extent possible in the effective display region and in a range that can be visually checked by the user, and pieces of line-of-sight data at these positions are acquired. This enables calculation of calibration data with high accuracy. A calibration value calculated from these pieces of line-of-sight data is set to calibration data, which makes it possible to provide a line-of-sight input with high accuracy without performing the calibration every time the user uses a line-of-sight input function. In the present exemplary embodiment, a calibration value calculated from acquired pieces of line-of-sight data and the direction of the digital camera 100 are saved and set in association with each other as calibration data.

In the present exemplary embodiment, the number of gaze points serving as display elements and displayed in a line-of-sight calibration mode is five. The five gaze points are displayed one by one in order, and if the acquisition of line-of-sight data at the first gaze point is successful, the first gaze point is hidden, and the second gaze point is displayed. Then, the acquisition of all the pieces of line-of-sight data is completed, and the calculation of a calibration value is completed, the line-of-sight calibration is completed.

The touch panel 70a and the display unit 28 can be integrally formed. For example, the touch panel 70a is configured so that the transmittance of light of the touch panel 70a does not hinder the display of the display unit 28. The touch panel 70a is attached to an upper layer of the display surface of the display unit 28. Input coordinates on the touch panel 70a are associated with display coordinates on the display screen of the display unit 28. This configuration makes it possible to provide a display object (a graphical user interface) as if the user can directly operate a screen displayed on the display unit 28. The system control unit 50 can detect the following operations on the touch panel 70a or the following states.

The operation that a finger or a pen that is not touched the touch panel 70a newly touches the touch panel 70a, i.e., the start of a touch (hereinafter referred to as a "touch-down").

The state in which the finger or the pen is touching the touch panel 70a (hereinafter referred to as a "touch-on").

The state in which the finger or the pen is moving while the finger or the pen keeps touching the touch panel 70a (hereinafter referred to as a "touch move").

The operation that the finger or the pen that has touched the touch panel 70a is separated from the touch panel 70a, i.e., the end of a touch (hereinafter referred to as a "touch-up").

The state in which nothing touches the touch panel 70a (hereinafter referred to as a "touch-off").

If a touch-down is detected, simultaneously, a touch-on is also detected. After the touch-down, normally, the touch-on continues to be detected unless a touch-up is detected. A touch move is detected also in the state where the touch-on is detected. Even if the touch-on is detected, a touch move is not detected unless the touch position is not moving. After a touch-up of all the fingers or the pen having touched the touch panel 70a is detected, a touch-off is detected.

The system control unit 50 is notified, via an internal bus, of these operations and states and the position coordinates at which the finger or the pen touches the touch panel 70a. The system control unit 50 determines what operation (touch operation) is performed on the touch panel 70a based on the information of which the system control unit 50 is notified. In the case of a touch move, the system control unit 50 can also determine, based on changes in the position coordinates, the moving direction of the finger or the pen moving on the touch panel 70a with respect to each of the vertical and horizontal components on the touch panel 70a. If a touch move performed by a predetermined distance or more is detected, the system control unit 50 determines that a slide operation is performed.

The operation of quickly moving the finger by some distance while the finger keeps touching the touch panel 70a, and then separating the finger from the touch panel 70a immediately after the quick movement is referred to as a "flick". In other words, the flick is the operation of quickly tracing the touch panel 70a with the finger in a flipping manner. If a touch move performed by a predetermined distance or more at a predetermined speed or more is detected, and a touch-up is detected immediately after the touch move, the system control unit 50 can determine that a flick is performed (can determine that a flick is performed following a slide operation). Further, a touch operation for simultaneously touching a plurality of places (e.g., two points) and bringing the touch positions close to each other is referred to as a "pinch-in", and a touch operation for separating the touch positions from each other is referred to as a "pinch-out". The pinch-out and the pinch-in are collectively referred to as a "pinch operation" (or simply as a "pinch").

The touch panel 70a may be a touch panel of any of various types such, as a resistive type, a capacitive type, a surface acoustic wave type, an infrared type, an electromagnetic induction type, an image recognition type, and a photosensor type. Although a method for detecting that a touch operation is performed in response to a contact of the finger or the pen with the touch panel 70a, or a method for detecting that a touch is performed in response to approach of the finger or the pen to the touch panel 70a is included depending on the type, either method can be used.

In the digital camera 100, a sound input unit (not illustrated) may be provided that transmits to the system control unit 50 a sound obtained from a microphone built into the digital camera 100 or a sound input device connected to the digital camera 100 via a sound input terminal. In this case, the system control unit 50 selects an input sound signal where necessary, performs analog-to-digital conversion on the input sound signal, and performs a level normalization process and a particular frequency reduction process, thus generating a sound signal.

(Present Exemplary Embodiment)

Figure 3A:
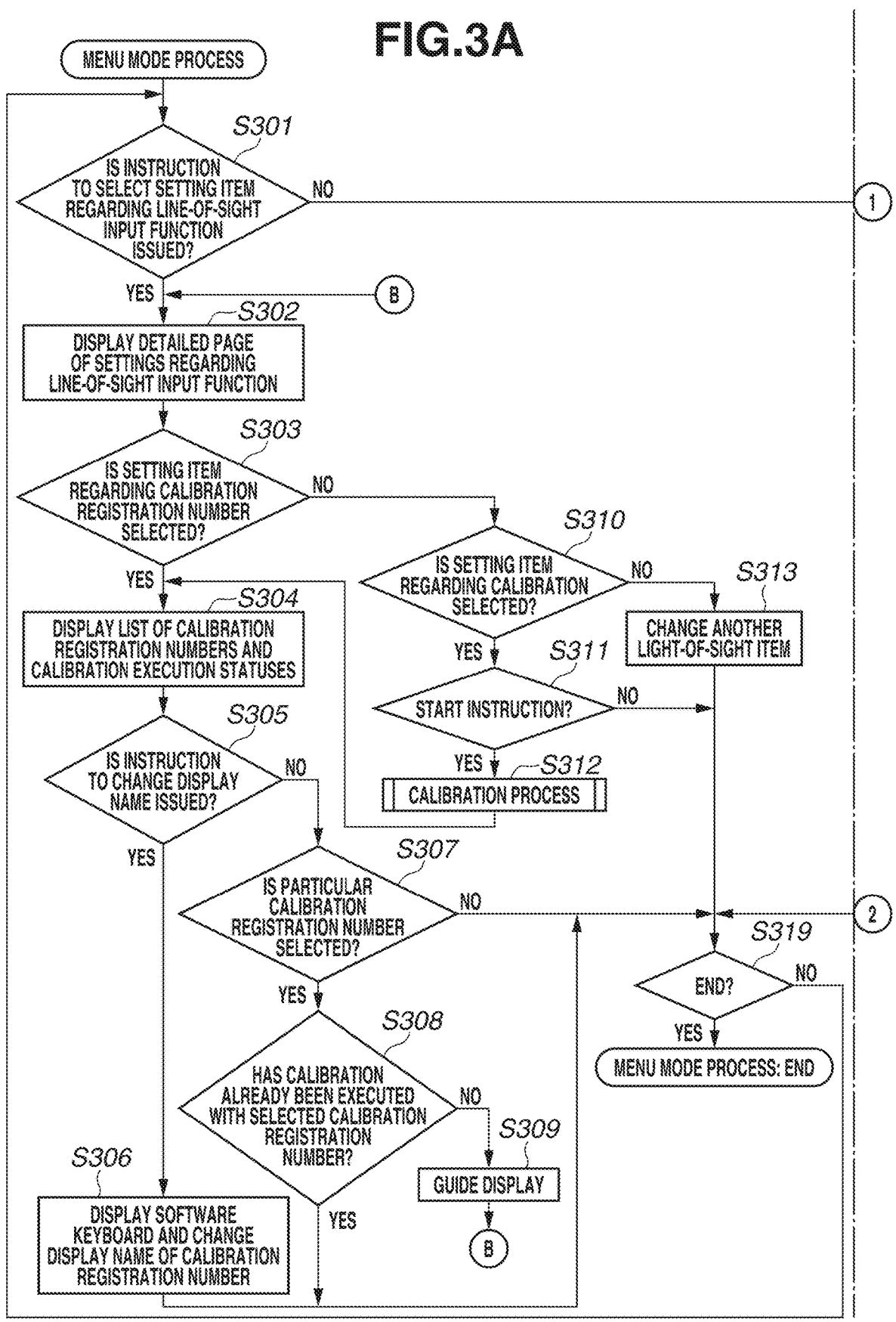
FIGS. 3A and 3B are a flowchart of a control process regarding a line-of-sight input function in a menu mode process according to one or more aspects of the present disclosure.
Figure 3B:
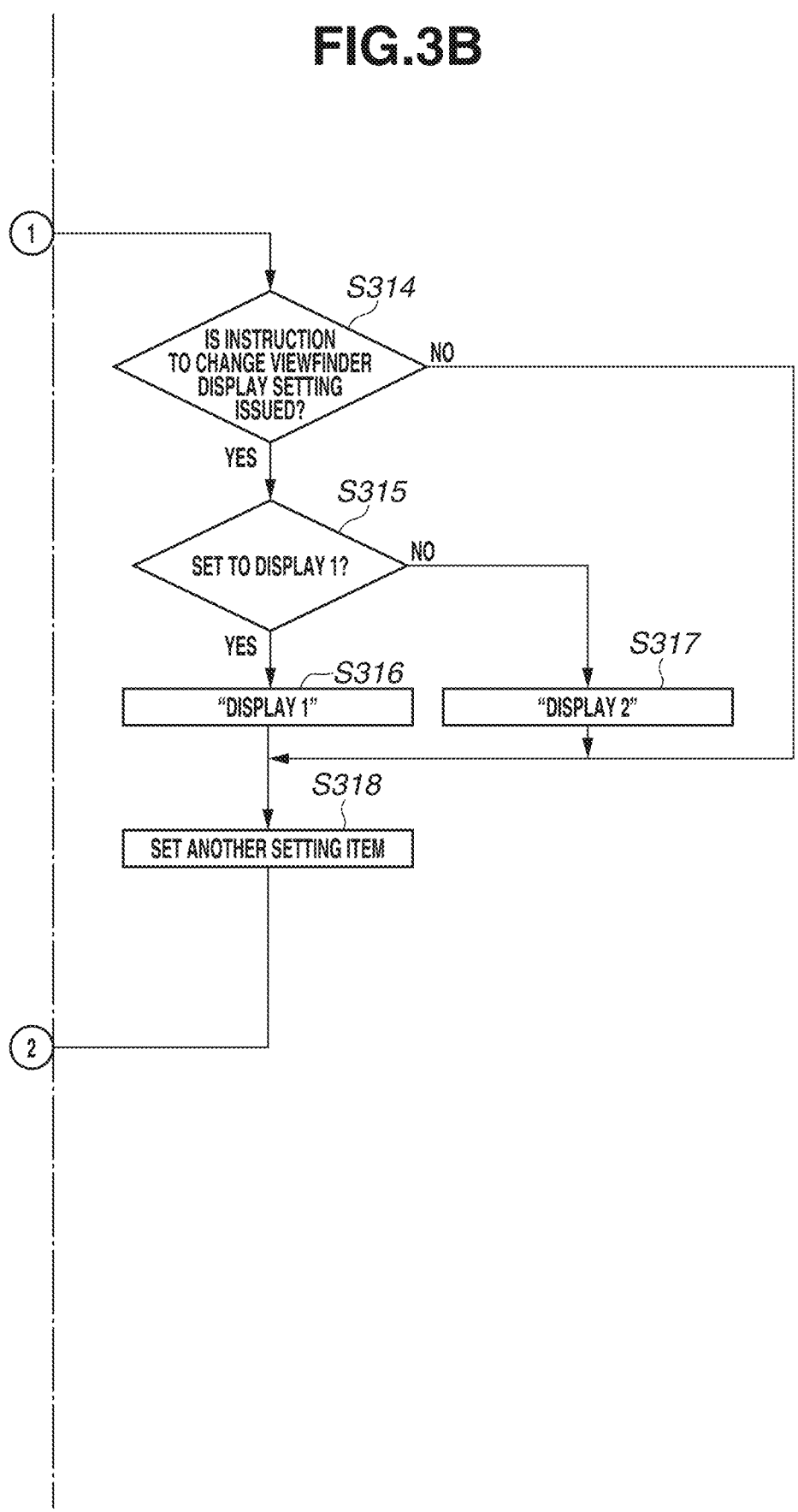

In the present exemplary embodiment, control is performed to, in accordance with the setting of a viewfinder display format made by the user, determine an effective display region indicating a range where the gaze points to be displayed on the EVF 29 in a calibration process (FIG. 5) illustrated in step S312 in FIGS. 3A and 3B can be displayed. The control according to the present exemplary embodiment will be described with reference to FIGS. 3 to 10E-2.

FIGS. 3A and 3B are a control flowchart for a menu mode process started when the digital camera 100 is started (powered on), the menu button 81 is pressed, and a screen transitions to a setting menu screen. This control process is implemented by the system control unit 50 loading a program stored in the non-volatile memory 56 into the system memory 52 and executing the program.

FIGS. 8A to 8F illustrate examples of display in the menu mode process described with reference to the control flowchart in FIGS. 3A and 3B. FIGS. 8A to 8F illustrate examples of display of setting menu screens regarding the line-of-sight input function.

Figure 8A:
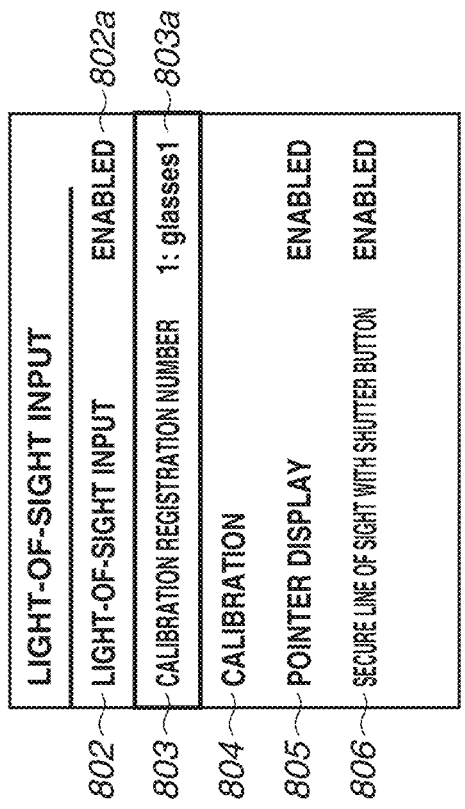

In step S301, the system control unit 50 determines whether a setting item regarding the line-of-sight input function is selected. If the setting item regarding the line-of-sight input function is selected (YES in step S301), the processing proceeds to step S302. If the setting item regarding the line-of-sight input function is not selected (a setting item other than that regarding the line-of-sight input function is selected) (NO in step S301), the processing proceeds to step S314. FIG. 8A illustrates an example of display performed on the EVF 29 at this time. A setting item 801 is an item regarding the settings of the line-of-sight input function. If the user selects the setting item 801, the screen transitions to a setting menu screen illustrated in FIG. 8B that is a detailed page of the settings regarding the line-of-sight input function. If the setting item 801 in FIG. 8A is selected, the determination is YES in this step.

Figure 8B:
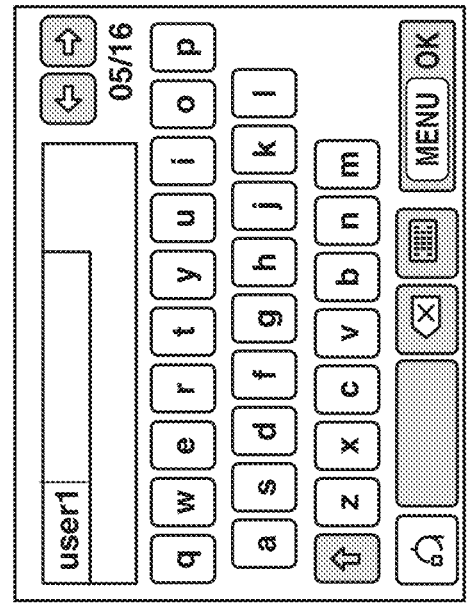

In step S302, the system control unit 50 displays the detailed page of the settings regarding the line-of-sight input function. FIG. 8B illustrates a display example to be displayed on the EVF 29 at this time. FIG. 8B is a lower hierarchical level (a child hierarchical level) below the setting item 801 in FIG. 8A. In the setting item 802, switching of the line-of-sight input function between "enabled" and "disabled" enables the switching between detecting or not detecting of the line of sight of the user, i.e., between driving and not driving of the line-of-sight detection block 160. In other words, if the line-of-sight input function is set to "enabled", an operation based on a line-of-sight input according to the line of sight of the user is received. If the line-of-sight input function is set to "disabled", an operation based on a line-of-sight input according to the line of sight of the user is not received. At this time, only in a case where the line-of-sight input function is "enabled", the line-of-sight detection block 160 is driven. In a case where the line-of-sight input function is "disabled", the line-of-sight detection block 160 is not driven (the digital camera 100 is powered off).

In step S303, the system control unit 50 determines whether a setting item regarding a calibration registration number is selected. If the setting item regarding the calibration registration number is selected (YES in step S303), the processing proceeds to step S304. If the setting item regarding the calibration registration number is not selected (a setting item other than that regarding the calibration registration number is selected) (NO in step S303), the processing proceeds to step S310. Specifically, if a setting item 803 in FIG. 8B is selected, the determination is YES in this step.

The setting item 803 is an item regarding the calibration registration number that is a number for classifying and registering data to implement a mechanism for the digital camera 100 to have a plurality of pieces of calibration data. Even in a case where a single user uses the line-of-sight input function of the digital camera 100, setting of calibration data for each of a case where the user uses the line-of-sight input function with the naked eye and a case where the user uses the line-of-sight input function with glasses on increases the accuracy of a line-of-sight input. In a case where not only the same user but also a plurality of users uses a single digital camera 100, setting and saving of calibration data for each user and using of the set and saved calibration data increases the accuracy for the line-of-sight position of the user. In response to the user selecting the setting item 803, the screen transitions to a lower hierarchical level (a child hierarchical level) of the calibration registration number, which is illustrated in FIG. 8C.

In step S304, the system control unit 50 displays a list of calibration registration numbers, display names, and calibration execution statuses of the respective calibration registration numbers (the setting statuses for pieces of calibration data). FIG. 8C illustrates a display example to be displayed on the EVF 29 at this time.

Figure 8C:
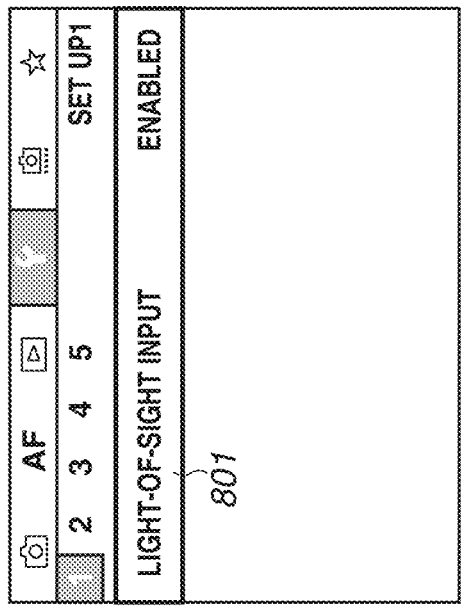

FIG. 8C illustrates a detailed page of the calibration registration number. In the present exemplary embodiment, six pieces of calibration data corresponding to registration numbers 1 to 6 can be registered in the digital camera 100. If the user has never executed the calibration, calibration data is not set and saved for any of the calibration registration numbers. As described above, calibration data is saved in association with the attitude of the digital camera 100. This means that, for example, pieces of calibration data on the horizontal and vertical orientations is able to be set and saved with the registration number "1", and a registration number is not assigned to each of the pieces of calibration data on the horizontal and vertical orientations.

For example, a list of calibration registration numbers 1 to 6 is displayed, and a display name freely set by the user for each of the calibration registration numbers is displayed (display items 803a and 803b). In a case where the user does not set a display name, nothing is displayed (a display item 803c). For each of the calibration registration numbers, information indicating whether calibration data has been set is displayed on this setting menu screen (a display item 813). The user can recognize, from the display item 813, that calibration data is not set and has not yet been set for the calibration registration number "1" (the display name "glasses 1") indicated by the display item 803a. In other words, the user can recognize whether calibration data has been set based on the presence or absence of the display item 813.

The display item 813 is a display item in which an oblique line is drawn on an icon representing a document and which indicates that no data is set. For the calibration registration number "2" (the display name "glasses 2") indicated by the display item 803*b*, calibration data has been set, and thus, the display item 813 is not displayed. If the user selects the display item 803*b* for which calibration data has been set, the screen transitions to the screen in FIG. 8B (returns to the parent hierarchical level). From this point onward, when the line-of-sight input function is used, the calibration data set in the display item 803*b* is used.

In response to the user selecting the display item 803*c* in which calibration data has not been set, the screen as illustrated in FIG. 8E is displayed to prompt the user to execute the calibration. In a case where the user issues an instruction to edit or change a display name in the state where a cursor is displayed on the display item 803*c*, the screen transitions to a screen illustrated in FIG. 8D.

The display item 813 is not limited to an icon as illustrated in FIG. 8C, and only needs to indicate that calibration data has not yet been set. As described above, for each registration number, it is possible to set two types of data, namely, pieces of data on the vertical and horizontal orientations, which are directions that can be adopted by the digital camera 100. Only in a case where pieces of calibration data have not yet been set on both the horizontal and vertical orientations of the digital camera 100, the display item 813 is displayed. Instead of displaying an icon indicating a setting status regarding the horizontal orientation as in the present exemplary embodiment, an icon indicating the presence or absence of the setting of each of the horizontal and vertical orientations may be displayed.

In step S305, the system control unit 50 determines whether a change instruction to change a display name is issued by the user. If the change instruction is issued (YES in step S305), the processing proceeds to step S306. If the change instruction is not issued (NO in step S305), the processing proceeds to step S307. The change instruction is determined as follows. For example, in a case where an info button (not illustrated) included in the digital camera 100 is pressed, it is determined that the change instruction to change the display name of a calibration registration number on which the cursor is displayed is issued.

Figure 8D:
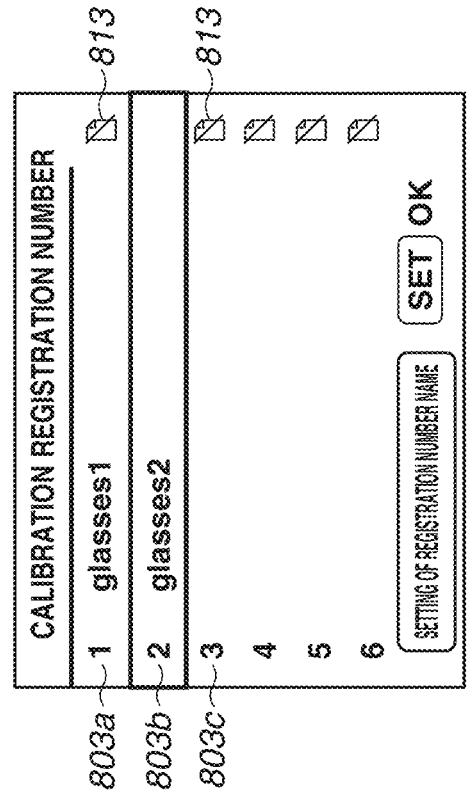

In step S306, the system control unit 50 displays a software keyboard for editing or changing the display name of the calibration registration number. If the user edits or changes the display name, the change in the display name is applied. FIG. 8D illustrates an example of display performed on the EVF 29 at this time.

FIG. 8D is a screen to which the screen transitions in a case where the instruction to edit or change the display name is issued by the user in the state where the cursor is displayed on any of the calibration registration numbers. The software keyboard is displayed on the EVF 29, and the user can input or change any display name.

In step S307, the system control unit 50 determines whether any particular one of the calibration registration numbers displayed as a list in step S304 is selected. If any particular one of the calibration registration numbers is selected (YES in step S307), the processing proceeds to step S308. If not (NO in step S307), the processing proceeds to step S319.

In step S308, the system control unit 50 determines whether the calibration has been executed (calibration data has been set) for the selected calibration registration number.

In step S309, the system control unit 50 displays a description regarding a calibration process. FIG. 8E illustrates a display example to be displayed on the EVF 29 at this time.

FIG. 8E is a display example to be displayed on the EVF 29 in a case where the calibration has not been executed for the selected calibration registration number. A message 807 notifies the user that the calibration has not been executed. This can prevent the user from feeling inconvenient due to a low accuracy of line-of-sight detection when the user uses the line-of-sight input function in the state where calibration data has not yet been set. If a display item 808 is selected, the screen returns to the upper hierarchical level (the parent hierarchical level) of the calibration registration number, i.e., the screen in FIG. 8B. The screen returns to the screen in FIG. 8B, so that the user who wishes to perform the calibration can select a setting item 804 and transition to the calibration process can be performed.

In step S310, since the determination is NO in step S303, the system control unit 50 determines whether a setting item regarding the calibration is selected. That is, the system control unit 50 determines whether the setting item 804 in FIG. 8B is selected. If the setting item regarding the calibration is selected (YES in step S310), the processing proceeds to step S311. If the setting item regarding the calibration is not selected (NO in step S310), the processing proceeds to step S313.

The setting item 804 is an item for starting the calibration process for acquiring line-of-sight data of the user. If the user selects the setting item 804, the processing proceeds to the calibration process, and the calibration for acquiring line-of-sight data of the user is started. The calibration process will be described with reference to FIG. 5. At this time, the calibration is executed for the calibration registration number indicated by the setting item 803, and if the calibration is completed, calibration data is set and saved in association with the calibration registration number.

In step S311, the system control unit 50 determines whether a start instruction to start the calibration is issued. If the start instruction is issued (YES in step S311), the processing proceeds to step S312. If the start instruction is not issued (NO in step S311), the processing proceeds to step S319. For example, the system control unit 50 displays the screen as illustrated in FIG. 8F on the EVF 29. In a case where a setting item 809 is selected, the determination is YES in this step.

FIG. 8F is a setting menu screen regarding the calibration, and the setting menu screen is displayed in a case where the setting item 804 in FIG. 8B is selected. In response to the setting item 809 that is an item for issuing an instruction to start the calibration for acquiring calibration data to be set for the selected calibration registration number is selected by the user, the calibration starts (the processing proceeds to FIG. 5), and line-of-sight data is acquired. If a setting item 810 is selected by the user, calibration data registered for the calibration registration number displayed in FIG. 8B is deleted.

If a setting item 811 is selected, calibration data set for the calibration registration number displayed in FIG. 8B is saved in a memory card (the recording medium 200), or calibration data saved in the memory card is read. Thus, in a case where the user uses another digital camera 100 having the line-of-sight input function, the user can use the line-of-sight input function without executing the calibration again. Thus, the user can use the line-of-sight input function without feeling inconvenience of executing the calibration many times.

In step S312, the system control unit 50 performs the calibration process. The calibration process will be described below with reference to FIGS. 5 and 6.

In step S313, since the determination is NO in step S310, the system control unit 50 changes a selected line-of-sight item. For example, in a case where a setting item 806 in FIG. 8B is selected, a process regarding pointer (indicator) display is executed on the line-of-sight position of the user detected by the line-of-sight detection block 160. If none of the line-of-sight items is selected, no process is executed, and the processing proceeds to step S319. The setting item 806 is an item regarding whether to assign the turning on of the first shutter switch 62 (the first shutter switch signal SW1), i.e., a half press of the shutter button 61, to an operation for finalizing the line-of-sight position (a line-of-sight finalization operation).

In step S314, since the determination is NO in step S301, the system control unit 50 determines whether a viewfinder display setting is changed. If the viewfinder display setting is changed (YES in step S314), the processing proceeds to step S315. If the viewfinder display setting is not changed (NO in step S314), the processing proceeds to step S318.

Figures 1, 10A:
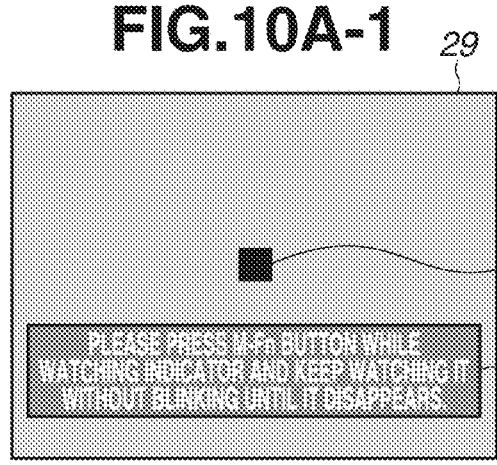
Figures 2, 10A:
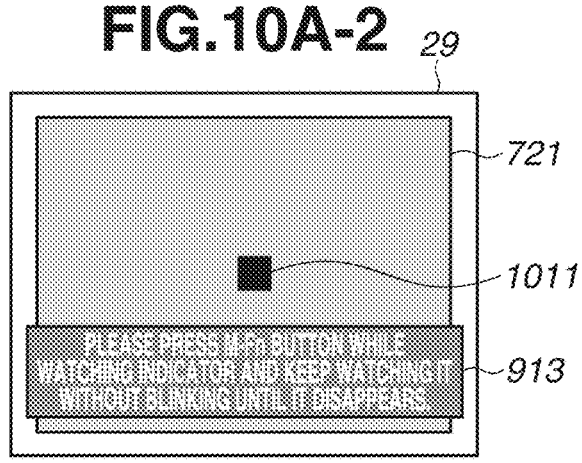

In step S315, the system control unit 50 references the non-volatile memory 56 and determines whether the viewfinder display setting is display 1. If the viewfinder display setting is the display 1 (YES in step S315), the processing proceeds to step S316. If not (NO in step S315), the processing proceeds to step S317. The viewfinder display setting is a setting regarding an effective display region of a live view image to be displayed on the EVF 29. FIGS. 7A-1 and 7A-2 illustrate display examples of viewfinder display setting screens. In the present exemplary embodiment, the viewfinder display setting has two settings, namely "display 1" and "display 2", as a viewfinder display format.

FIGS. 7A-1 and 7A-2 each illustrate display on a setting menu screen, and thus, if the eye of the user is in proximity to the eyepiece portion 16, the setting screen is displayed on the EVF 29. If the eye of the user is not in proximity to the eyepiece portion 16, the setting screen is displayed on the display unit 28. However, after a setting is made, and if the processing transitions to an image capturing mode process or the calibration process, display is performed according to the setting of the viewfinder display format only in a case where the eye of the user is in proximity to the eyepiece portion 16. In a case where the user views the display unit 28 with their eye separated from the eyepiece portion 16, display is performed regardless of the setting of the viewfinder display format.

As illustrated in FIG. 7A-1, if a cursor is arranged on a selection item 701, a preview screen to be displayed on the EVF 29 in the case of the display 1 is displayed (a preview 704). If a determination is made (a display item 703 is selected) in the state illustrated in FIG. 7A-1, the viewfinder display format is set to the "display 1".

Similarly, as illustrated in FIG. 7A-2, if the cursor is arranged on a selection item 702, a preview screen of the LV image to be displayed on the EVF 29 in the case of the display 2 is displayed (a preview 705). If the display item 703 is selected in this state, the viewfinder display format is set to the "display 2". In the display 2, the LV image is displayed not in the entirety of a display region of the EVF 29, but in a region one size smaller. As will be described below, if a user wearing glasses sets the display 1, the user cannot sufficiently visually check the four corners of the LV image displayed in the entirety of the EVF 29. Setting the display region to be one size smaller as in the display 2 enables the user wearing glasses to visually check the LV image in detail in every corner thereof. Thus, the user is enabled to optionally set the display region in the EVF 29.

In the initial settings (the settings before shipment from the factory), the viewfinder display format is set to the "display 1".

In step S316, the system control unit 50 sets the viewfinder display format to the "display 1" (does not change the setting of the viewfinder display format from the "display 1") and saves the setting of the viewfinder display format in the non-volatile memory 56. FIG. 7B-1 illustrates an example of the display of the LV image in an image capturing standby state displayed on the EVF 29 at this time. FIG. 7C-1 illustrates the effective display region in the calibration process. FIGS. 10A-1, 10B-1, 10C-1, 10D-1, and 10E-1 illustrate examples of display when pieces of line-of-sight data are acquired in the calibration process.

In step S317, the system control unit 50 sets the viewfinder display format to the "display 2" and saves the setting of the viewfinder display format in the non-volatile memory 56. FIG. 7B-2 illustrates an example of the display of the LV image in an image capturing standby state displayed on the EVF 29 at this time. FIG. 7C-2 illustrates an example of the display of the effective display region in the calibration process. When the user views the EVF 29 with their eye in proximity to the eyepiece portion 16, a range that the user can visually check in the EVF 29 differs between a case where the user views the EVF 29 with the naked eye and a case where the user views the EVF 29 with glasses on. In particular, in a case where the user wears glasses having concave lenses, due to the mechanisms of the concave lenses, the EVF 29 is more enlarged (the distance between the eye 161 of the user and the EVF 29 becomes shorter) and the range that can be visually checked in the EVF 29 becomes smaller than in a case where the user views the EVF 29 with the naked eye. Thus, if a rectangle (e.g., the LV image as illustrated in FIG. 7B-2) is displayed in the entirety of the EVF 29, the user cannot visually check the four corners of the rectangle. When the user wearing glasses attempts to visually check the four corners, the user is to shift the position of the eye 161 relative to the eyepiece portion 16 and look into the EVF 29.

In particular, in the calibration process, if the positional relationship between the eyepiece portion 16 (the line-of-sight detection block 160) and the eye 161 changes, the condition for each piece of line-of-sight data to be acquired in the calibration process differs. Thus, the accuracy of calibration data to be calculated decreases. If the accuracy of the calibration data decreases, and when the line-of-sight input function is used in the image capturing mode process, a position actually viewed by the user and a detected line-of-sight position may shift from each other, and the user may find it difficult to use the line-of-sight input function. Thus, in the display 2, the effective display region is made smaller so that the user can gaze at the gaze points without looking into the EVF 29 while changing the position (without a change in the positional relationship between the line-of-sight detection block 160 and the eye 161), and line-of-sight data with high accuracy can be acquired in the calibration process. As in the display 2, the effective display region in the EVF 29 is made one size smaller than that in the display 1, so that the user can sufficiently visually check the LV image and the effective display region displayed on the EVF 29 without changing the position to look into the four corners.

In step S318, the system control unit 50 sets another setting item. On a setting menu screen, the user makes a setting other than the settings regarding the line-of-sight input function.

In step S319, the system control unit 50 determines whether the processing ends. If the processing ends (YES in step S319), the control processing in the flowchart in FIGS. 3A and 3B ends. If not (NO in step S319), the processing returns to step S301.

Figure 4A:
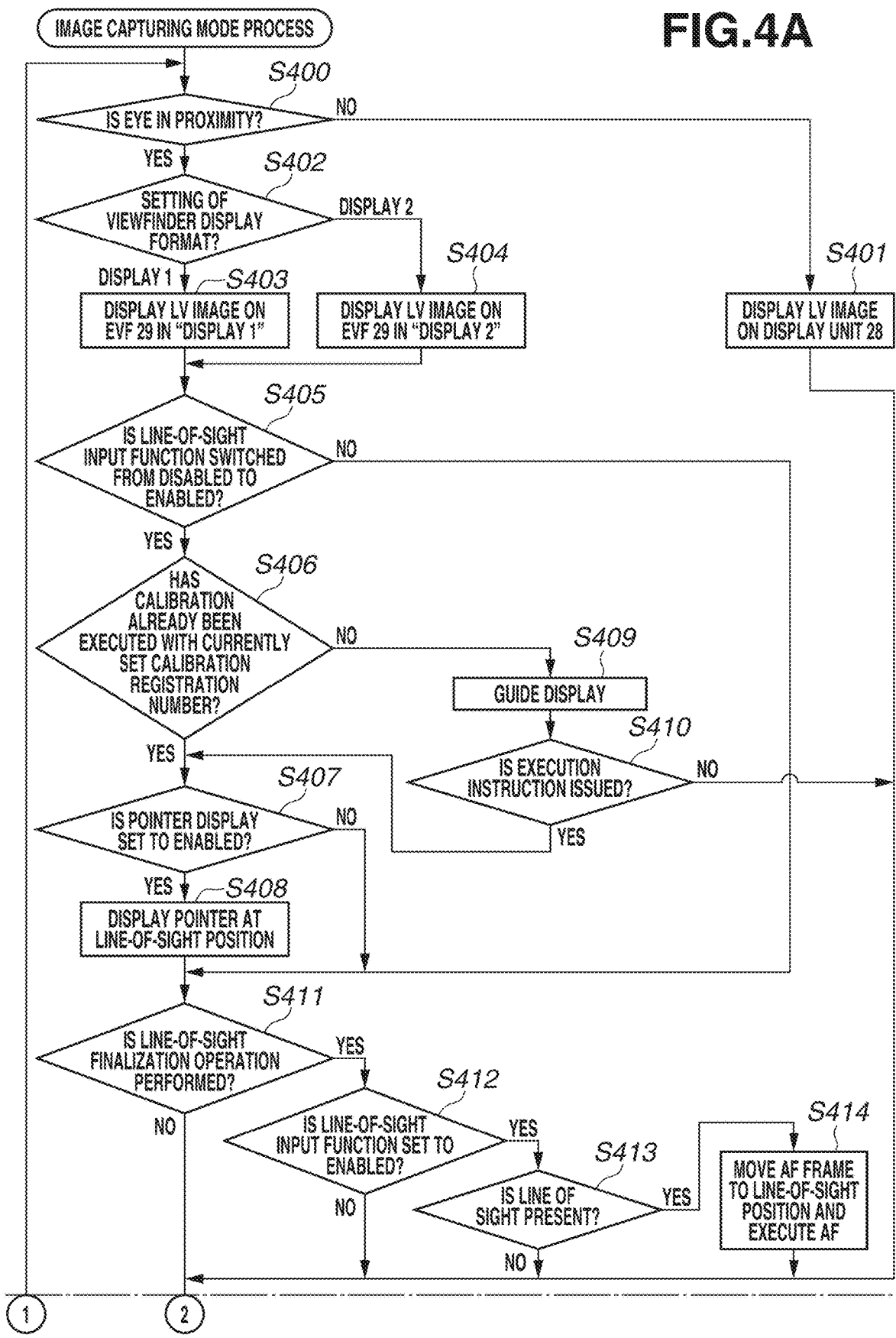
FIGS. 4A and 4B are flowchart of a display control process for an image capturing mode process according to one or more aspects of the present disclosure.
Figure 4B:
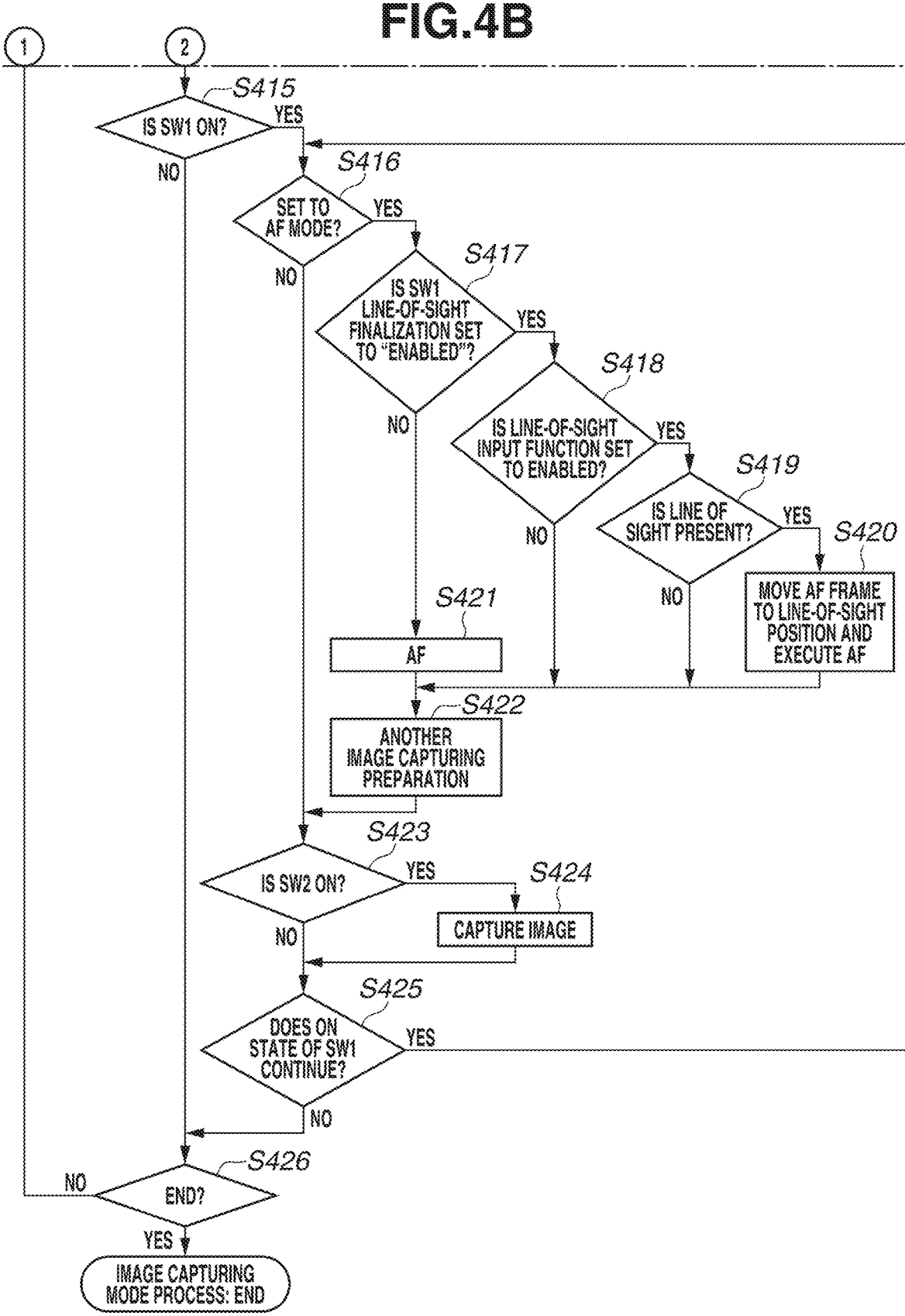

FIGS. 4A and 4B are a flowchart for control processing for an image capturing mode process started in a case where the digital camera 100 is started (powered on) and is in an image capturing standby state. This control process is implemented by the system control unit 50 loading a program stored in the non-volatile memory 56 into the system memory 52 and executing the program.

In step S400, using the eye proximity detection unit 57, the system control unit 50 determines whether the eye is in proximity to the eyepiece portion 16. If the eye is in proximity to the eyepiece portion 16 (YES in step S400), the processing proceeds to step S402. If the eye is not in proximity to the eyepiece portion 16 (NO in step S400), the processing proceeds to step S401.

In step S401, the system control unit 50 displays an LV image on the display unit 28, and the processing proceeds to step S415. At this time, the line-of-sight input function is not performed regardless of the setting specifications of the line-of-sight input function.

In the present exemplary embodiment, since the line-of-sight detection block 160 is arranged in the eyepiece portion 16, a line of sight can be detected only in a case where the eye of the user is in proximity to the eyepiece portion 16. Thus, in a case where the eye of the user is separated from the eyepiece portion 16, the line-of-sight input function cannot be used.

In step S402, the system control unit 50 references the non-volatile memory 56 and determines the setting of the viewfinder display format. If the viewfinder display format is set to the "display 1", the processing proceeds to step S403. If the viewfinder display format is set to the "display 2", the processing proceeds to step S404.

In step S403, the system control unit 50 displays an LV image and image capturing information in the display form of the "display 1" (FIG. 7B-1) on the EVF 29. At this time, the image capturing information is displayed in a region 715, and an LV 711 is displayed in a region 713 other than the region 715.

In step S404, the system control unit 50 displays the LV image and the image capturing information in the display form of the "display 2" (FIG. 7B-2) on the EVF 29. In the display format of the "display 2", an effective display region of the LV image is smaller than that in the "display 1". The image capturing information is displayed in the region 715, and the LV 711 is displayed in a region 714. The region 714 has a range obtained by reducing the region 713. As compared with the case of the "display 1", there is a margin around the LV 711.

In the present exemplary embodiment, in the effective display region other than the region 715 in the EVF 29, the region 714 has the lower side in contact with the region 715 and is located in the center. Even if the viewfinder display format is set to the display 2, and if the effective display region of the LV image is displayed not in the center of the EVF 29, but on any of the upper, lower, left, and right sides in a shifted manner, the user cannot visually check a part of the LV image, which leads to the user to look into the EVF 29 with a change in the position. As a result, the above inconvenience cannot be solved. Thus, in the case of display as in the "display 2", the effective display region of the LV image is displayed in the center.

Thus, the LV image is displayed in an effective display region desired by the user, and a user wearing glasses and the like can visually check the LV image in detail. This is also user-friendly even for a user, not wearing glasses, who does not wish to move the line of sight largely when checking the LV image. Since an effective display region of the image capturing information does not change, the amount of information regarding the image capturing information displayed on the EVF 29 does not change.

In step S405, the system control unit 50 determines whether the line-of-sight input function is switched from "disabled" to "enabled". If the line-of-sight input function is switched to "enabled" (YES in step S405), the processing proceeds to step S406. If the line-of-sight input function is not switched (NO in step S405), the processing proceeds to step S411. A switch instruction to switch the line-of-sight input function can be assigned to any of the operation members of the operation unit 70. Thus, the line-of-sight input function can be switched in accordance with an operation on the operation member in the image capturing standby state without transitioning to the setting menu screen.

In step S406, the system control unit 50 determines whether the calibration has already been executed (calibration data has already been set) for the currently set calibration registration number. If the calibration has already been executed (YES in step S406), the processing proceeds to step S407. If the calibration has not been executed (NO in step S406), the processing proceeds to step S409.

In step S407, the system control unit 50 references the non-volatile memory 56 and determines whether the pointer display setting is set to "enabled". If the pointer display setting is set to "enabled" (YES in step S407), the processing proceeds to step S408. If the pointer display setting is set to "disabled" (NO in step S407), the processing proceeds to step S411.

In FIG. 8B, a setting item 805 indicates the pointer display setting. The setting item 805 indicates whether a pointer is to be displayed at a detected line-of-sight position. If the setting item 805 is set to "enabled", the pointer is displayed at a line-of-sight position detected by the line-of-sight detection block 160. This enables the user to visually check at which position their line of sight is detected (a detection position). If the setting item 805 is set to "disabled", the pointer is not displayed at the line-of-sight position.

In the present exemplary embodiment, the display form of the pointer is configured such that a smaller circle centered on the line-of-sight position is displayed and that a circle one size larger is further displayed around the smaller circle. If the line-of-sight input function of the setting item 802 is set to "disabled", the pointer is not displayed at the detected line-of-sight position regardless of whether the setting specification of the pointer display of the setting item 805 is "enabled" or "disabled".

In step S408, the system control unit 50 displays the pointer at a line-of-sight position detected by the line-of-sight detection unit block 160 so that the user can visually check the detected line-of-sight position.

In step S409, the system control unit 50 displays on the EVF 29 a guide indicating that the calibration has not been executed, i.e., calibration data is not set. FIG. 8E illustrates an example of display at this time. If the user uses the line-of-sight input function in the state where the calibration has not been executed (calibration data has not yet been set), a position viewed by the user and a detected line-of-sight position may shift, and it is highly likely that the user finds it difficult to use various functions based on a line-of-sight input. Thus, guide display (the message 807) that prompts the user to set calibration data is displayed.

In step S410, the system control unit 50 determines whether an execution instruction is issued. If the execution instruction is issued (YES in step S410), the system control unit 50 hides the guide display displayed in step S409, and the processing returns to step S407. If the execution instruction is not issued (NO in step S410), the processing proceeds to step S415. The execution instruction refers, specifically, to an instruction issued to the display item 808 illustrated in FIG. 8E. Together with the guide display described above in step S409 (the message 807 in FIG. 8E), a shortcut button for transitioning to the calibration process may be displayed so that the user can cause the screen to directly transition to the calibration process without causing the screen to transition to the setting menu screen. In a case where the menu button 81 is pressed by the user, the system control unit 50 hides the guide display, and the processing proceeds to step S302 in FIG. 3A.

In step S411, the system control unit 50 determines whether a line-of-sight finalization operation is performed. If the line-of-sight finalization operation is performed (YES in step S411), the processing proceeds to step S412. If the line-of-sight finalization operation is not performed (NO in step S411), the processing proceeds to step S415. The line-of-sight finalization operation is an operation for issuing an instruction to execute a process based on a region corresponding to a detected line-of-sight position of the user. In the present exemplary embodiment, the pressing of the line-of-sight finalization button 82 is set to the line-of-sight finalization operation, and in accordance with the line-of-sight finalization operation, a region corresponding to the line-of-sight position of the user is set to a target region for a focusing process (an AF process), and the AF process is executed.

In step S412, the system control unit 50 determines whether the line-of-sight input function is set to "enabled". If the line-of-sight input function is set to "enabled" (YES in step S412), the processing proceeds to step S413. If the line-of-sight input function is set to "disabled" (NO in step S412), the processing proceeds to step S415.

In step S413, the system control unit 50 determines whether a line of sight is present. If the line-of-sight detection block 160 can detect the line of sight of the user, the system control unit 50 determines that a line of sight is present (YES in step S413), and the processing proceeds to step S414. If a line of sight is not present (NO in step S413), the processing proceeds to step S415.

In step S414, the system control unit 50 moves the AF frame to a position based on the line-of-sight position of the user on the EVF 29 detected and calculated by the line-of-sight detection block 160 at the time when the line-of-sight finalization operation is performed in step S411. The system control unit 50 then executes AF.

In step S415, the system control unit 50 determines whether the first shutter switch 62 is turned on. If the first shutter switch 62 is turned on (YES in step S415), the processing proceeds to step S416. If not (NO in step S415), the processing proceeds to step S426. That the first shutter switch 62 is turned on refers to a state where the shutter button 61 is half-pressed. In other words, it can be assumed that the user is about to capture an image.

In step S416, the system control unit 50 determines whether the focus mode is set to an AF mode. If the focus mode is set to the AF mode (YES in step S416), the processing proceeds to step S417. If not (if the focus mode is set to a manual focus (MF) mode) (NO in step S416), the processing proceeds to step S423. The AF mode and the MF mode are switched using a switch included in a setting menu screen or outside the lens unit 150.

In step S417, the system control unit 50 references the non-volatile memory 56 and determines whether SW1 line-of-sight finalization is set to "enabled". If the SW1 line-of-sight finalization is set to "enabled" (YES in step S417), the processing proceeds to step S418. If the SW1 line-of-sight finalization is set to "disabled" (NO in step S417), the processing proceeds to step S421.

In FIG. 8B, the setting item 806 indicates the setting of the SW1 line-of-sight finalization. If the setting item 806 is set to "enabled", a line-of-sight position detected by the line-of-sight detection block 160 at the time when the user half-presses the shutter button 61 is finalized. If the setting item 806 is set to "disabled", the line-of-sight position is not finalized by half-press of the shutter button 61. In FIG. 8B, the line-of-sight input function is set to "enabled", the calibration registration number is set to "1" (the display name: "glasses 1"), the pointer display is set to "enabled", and the SW1 line-of-sight finalization function is set to "disabled". In other words, the line-of-sight position of the user is detected, and the pointer is displayed in the LV image displayed on the EVF 29. The AF frame is moved to the line-of-sight position with a line-of-sight finalization operation, and AF is executed. However, the AF frame does not move to the line-of-sight position based on the first shutter switch signal SW1.

In step S418, as in step S412, the system control unit 50 determines whether the line-of-sight input function is set to "enabled". If the line-of-sight input function is set to "enabled" (YES in step S418), the processing proceeds to step S419. If the line-of-sight input function is set to "disabled" (NO in step S418), the processing proceeds to step S422.

In step S419, as in step S413, the system control unit 50 determines whether a line of sight is present. If the line-of-sight detection block 160 can detect the line of sight of the user, the system control unit 50 determines that a line of sight is present (YES in step S419), and the processing proceeds to step S420. If a line of sight is not present (NO in step S419), the processing proceeds to step S422.

In step S420, the system control unit 50 moves the AF frame to a position based on the line-of-sight position of the user on the EVF 29 detected and calculated by the line-of-sight detection block 160 at the time when the first shutter switch 62 is turned on in step S415. The system control unit 50 then executes AF. In this step, since the determination is YES in step S417, as described above in conjunction with the setting item 806 in FIG. 8B, it is determined that a line-of-sight finalization operation is performed in response to the first shutter switch 62 being turned on. The AF frame is then moved to the detected line-of-sight position.

In step S421, the system control unit 50 performs the AF process based on the display position of the AF frame.

In step S422, the system control unit 50 performs other image capturing preparation processes, such as an AE process and an AWB process.

In step S423, the system control unit 50 determines whether the second shutter switch 64 is turned on. If the second shutter switch 64 is turned on, i.e., the shutter button 61 is full-pressed (YES in step S423), the processing proceeds to step S424. If not (NO in step S423), the processing proceeds to step S425. In the present exemplary embodiment, a full press of the shutter button 61 is set to an image capturing instruction. Alternatively, for example, a touch operation on an icon displayed on the touch panel 70*a* may be set to an image capturing instruction.

In step S424, the system control unit 50 performs a series of operations of an image capturing process until a captured image is recorded as an image file in the recording medium 200.

In step S425, the system control unit 50 determines whether the on state of the first shutter switch 62 continues. If the on state of the first shutter switch 62 continues (YES in step S425), the processing returns to step S416. If the on state of the first shutter switch 62 ends (NO in step S425), the processing proceeds to step S426.

In step S426, the system control unit 50 determines whether the image capturing mode ends. If the image capturing mode ends (YES in step S426), the control flowchart in FIGS. 4A and 4B ends. If the image capturing mode does not end (NO in step S426), the processing returns to step S400. The image capturing mode ends, for example, by the digital camera 100 being turned off or by transitioning of the screen to the setting menu screen in response to the pressing of the menu button 81.

Figure 5:
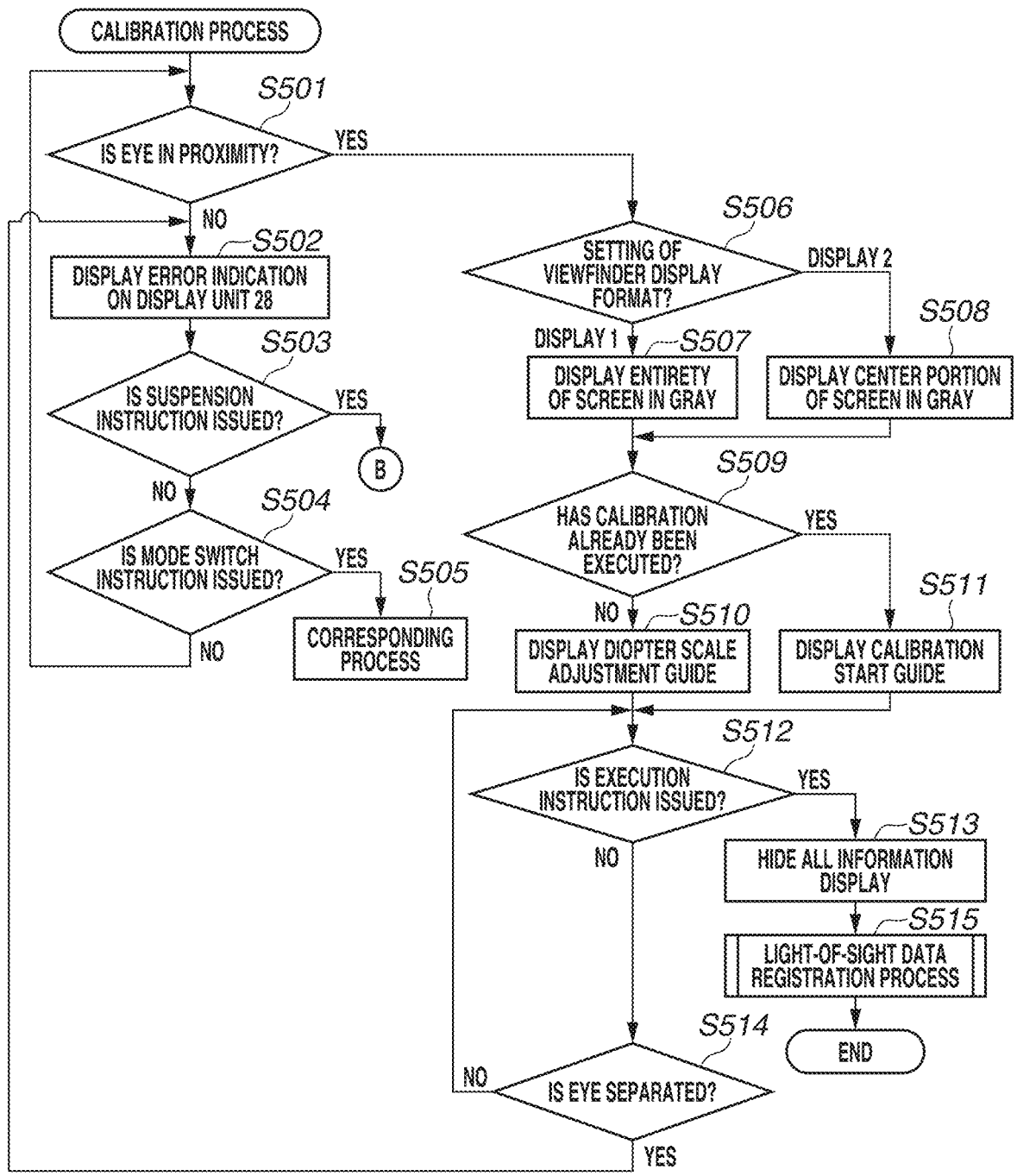
FIG. 5 is a flowchart of a control process for a calibration process regarding a line of sight according to one or more aspects of the present disclosure.

FIG. 5 is a flowchart of a control process for the calibration process, which is started in a case where the processing proceeds to step S312 in FIG. 3A (the determination is YES in step S311). In other words, the calibration process is started in a case where the digital camera 100 is started, and a calibration execution instruction is issued (the setting item regarding the calibration is selected) on the setting menu screen (in the menu mode process). This control process is implemented by the system control unit 50 loading a program stored in the non-volatile memory 56 into the system memory 52 and executing the program.

In step S501, as in step S400, the system control unit 50 determines whether the eye is in proximity to the eyepiece portion 16. If the eye is in proximity to the eyepiece portion 16 (YES in step S501), the processing proceeds to step S506. If the eye is not in proximity to the eyepiece portion 16 (NO in step S501), the processing proceeds to step S502.

In step S502, the system control unit 50 displays an error indication on the display unit 28. To cause the user with their eye separating from the eyepiece portion 16 to visually check an LV image, guide display (a message 901) is displayed not on the EVF 29, but on the display unit 28. FIG. 9A illustrates an example of display at this time.

FIG. 9A is a display example to be displayed on the display unit 28 in a case where, after a calibration start instruction is issued (the setting item 804 in FIG. 8F is selected), the eye is separated from the eyepiece portion 16. In the present exemplary embodiment, since the line-of-sight detection block 160 is arranged in the eyepiece portion 16, calibration data cannot be acquired unless the eye of the user is in proximity to the eyepiece portion 16. Thus, the message 901 is displayed on the display unit 28 to prompt the user to place their eye in proximity to the eyepiece portion 16. If a display item 902 is selected, the calibration is suspended, and the processing proceeds from the calibration process to the menu mode process (from FIG. 9A to FIG. 8B). If the user places their eye in proximity to the eyepiece portion 16 (if the detection of the eye in proximity to the eyepiece portion 16 is resumed by the eye proximity detection unit 57), the display on the display unit 28 (the display in FIG. 9A) is hidden, and the screen as in FIG. 9B or 9C is displayed on the EVF 29. For a mechanism with which calibration data is acquirable even in the state where the eye is not in proximity to the eyepiece portion 16, the screen as illustrated in FIG. 9A is not to be displayed.

In step S503, the system control unit 50 determines whether a suspension instruction is issued. If the suspension instruction is issued (YES in step S503), the processing returns to step S302 in FIG. 3A. If the suspension instruction is not issued (NO in step S503), the processing proceeds to step S504. The suspension instruction refers to the selection of the display item 902 in FIG. 9A.

In step S504, the system control unit 50 determines whether a mode switch instruction is issued. If the mode switch instruction is issued (YES in step S504), the processing proceeds to step S505. If the mode switch instruction is not issued (NO in step S504), the processing returns to step S501.

In step S505, the system control unit 50 advances the processing to a process corresponding to the mode switch instruction issued in step S504. Specifically, in response to the menu button 81 being pressed, the processing proceeds to the menu mode process (FIGS. 3A and 3B). In response to the reproduction button 79 being pressed, the processing proceeds to the process of reproducing an image.

In step S506, since a result of the determination is YES in step S501, the system control unit 50 references the non-volatile memory 56 and determines the setting of the viewfinder display format. If the viewfinder display format is set to the "display 1", the processing proceeds to step S507. If the viewfinder display format is set to the "display 2", the processing proceeds to step S508.

In step S507, the system control unit 50 sets an effective display region to be displayed on the EVF 29 to the entirety of the inside of the EVF 29. FIG. 7C-1 illustrates an example of display at this time. Since the viewfinder display format is set to the display 1, the effective display region indicating the range where the gaze points are to be displayed in the calibration process is also set to the entirety of the EVF 29, i.e., a region 720 in FIG. 7C-1. At this time, the region 720 is indicated by a gray image.

In FIG. 7C-1, the entirety of the EVF 29 is set as the effective display region. The present exemplary embodiment, however, is not limited to this.

That is, in a case where the aspect ratios of regions that can be displayed are different as in the display unit 28 and the EVF 29, the display size of the effective display region is maximized. For example, even if margins appear over and under the effective display region, the present exemplary embodiment is not affected at all.

In step S508, the system control unit 50 sets the effective display region to be displayed on the EVF 29 to a region (a partial region) one size smaller than the entirety of the EVF 29. FIG. 7C-2 illustrates an example of display at this time. A region 721 in FIG. 7C-2 is set to the effective display region where the gaze points are to be displayed in the calibration process, and the region 721 is indicated by a gray image. The region 721 is a region obtained by reducing the region 720 to about 85%.

FIGS. 7C-1 and 7C-2 illustrate examples of the display of a gaze point display region corresponding to the viewfinder display format used when a line-of-sight data registration process is performed in the calibration process. The gaze point display region refers to a region where the gaze points to be displayed when the calibration is executed are displayed. The gaze points are not displayed outside the gaze point display region. The gaze point display region is displayed before the calibration is executed or when the execution of the calibration is started, so that the user can determine in advance whether the user can recognize the gaze points in the state where the user looks into the viewfinder.

For example, in the present exemplary embodiment, the gaze point display region is indicated by a gray image. When the calibration is executed, the gaze points are displayed at positions determined in advance in the range of the gray image.

A method for displaying the gaze point display region is not limited to the gray image. For example, the following display may be employed. A pattern image indicated by a particular design may be displayed, or the four corners of the gaze point display region may be indicated by L-shaped brackets, or the outer periphery of the gaze point display region may be surrounded. To cause the user to recognize that calibration different from both the menu mode process and the image capturing mode process is to be performed, an image that allows the distinction from another mode process may be used, and the range of the region may be able to be recognized. The reason for the gray image is that in terms of the characteristics of the human eye, the degree of opening of the pupil of the eye in a case where a person views a color that is not too bright or too dark as white or black, and can also be easily distinguished from black is the most suitable for acquiring line-of-sight data. For example, in the present exemplary embodiment, the effective display region indicating the range where the gaze points can be displayed is indicated by an image in a color represented by red, green, and blue (RGB) values (119, 119, 119) (gray).

In step S509, the system control unit 50 determines whether the calibration has been executed (calibration data has been set) for the currently set calibration registration number. If the calibration has been executed (YES in step S509), the processing proceeds to step S511. If the calibration has not been executed (NO in step S509), the processing proceeds to step S510.

In step S510, the system control unit 50 displays on the EVF 29 a message indicating that the user should adjust the diopter scale before the calibration is performed. When the calibration is executed, data (line-of-sight data) on the eye of the user gazing at each gaze point displayed on the EVF 29 is acquired. Thus, adjusting of the diopter scale facilitates gazing of the user at the gaze point, and also increases the accuracy of line-of-sight data to be acquired. FIG. 9B illustrates an example of display at this time (a message 903).

FIG. 9B is guide display which is displayed on the EVF 29 in a case where the calibration is started (the setting item 809 in FIG. 8F is selected) in the state where calibration data has not been set for the calibration registration number selected by the user. Since the calibration has not been executed for the calibration registration number selected by the user, having the user adjust the diopter scale increases the accuracy of calibration data to be acquired hereafter. Thus, guide display as illustrated in the message 903 is performed.

In a display item 904, the currently set calibration registration number and the display name are displayed. As illustrated in a display item 905, if the M-Fn button 83 is pressed, it is considered that the adjustment of the diopter scale by the user ends. The calibration is then started (the screen transitions to a screen illustrated in FIG. 9D).

FIG. 9D illustrates an example of display when the calibration process is started, and this example is the same as that in FIG. 10A-1.

Not only the guide display regarding the adjustment of the diopter scale, but also guide display regarding other elements with which the accuracy of calibration data to be acquired is increased may be performed.

In step S511, the system control unit 50 displays on the EVF 29 a message indicating that the calibration will be performed. FIG. 9C illustrates an example of display at this time. The display of the message 903 in FIG. 9B in step S510 is replaced with the display of a message "calibration will be performed" (a message 906) on the EVF 29. If the calibration has been executed, it can be assumed that the user has made an adjustment such as the adjustment of the diopter scale. Thus, the message 903 is not displayed.

In step S512, the system control unit 50 determines whether an execution instruction is issued. If the execution instruction is issued (YES in step S512), the processing proceeds to step S513. If the execution instruction is not issued (NO in step S512), the processing proceeds to step S514. The execution instruction refers to an instruction issued by the user to the display item 905 in FIG. 9B or 9C. In the example illustrated in FIG. 9B, if the M-Fn button 83 is pressed, the system control unit 50 determines that the execution instruction has been input. It is assumed that, after the user gives the execution instruction in this step, the calibration is to be executed in the state where the user remains in the posture in which the user has issued the execution instruction. Thus, it is desirable that an operation member for issuing the execution instruction should be arranged at the position at which the user can operate the operation member while the eye is in proximity to the eyepiece portion 16 and in the state where the user firmly holds the grip portion 90 with their right hand. This is to prevent the relative positional relationship between the line-of-sight detection block 160 and the eye 161 from changing.

In step S513, the system control unit 50 hides all the information display such as the image capturing information displayed on the EVF 29. Thus, in the process of acquiring a line-of-sight data, i.e., when the gaze points are sequentially displayed and pieces of line-of-sight data are acquired, the user can gaze at the gaze points without becoming confused by other information other than the gaze points (without gazing at the other information).

In step S514, since a result of the determination is NO in step S512, the system control unit 50 determines whether the eye is separated from the eyepiece portion 16. If the eye is separated from the eyepiece portion 16 (YES in step S514), the processing returns to step S502. If the eye is not separated from the eyepiece portion 16 (the eye continues to be in proximity to the eyepiece portion 16)(NO in step S514), the processing returns to step S512.

In step S515, the system control unit 50 performs a line-of-sight data registration process. The line-of-sight data registration process will be described below with reference to FIG. 6. If the line-of-sight data registration process (a control process flowchart in FIG. 6) ends, the processing returns to step S302 in FIG. 3A.

Figure 6:
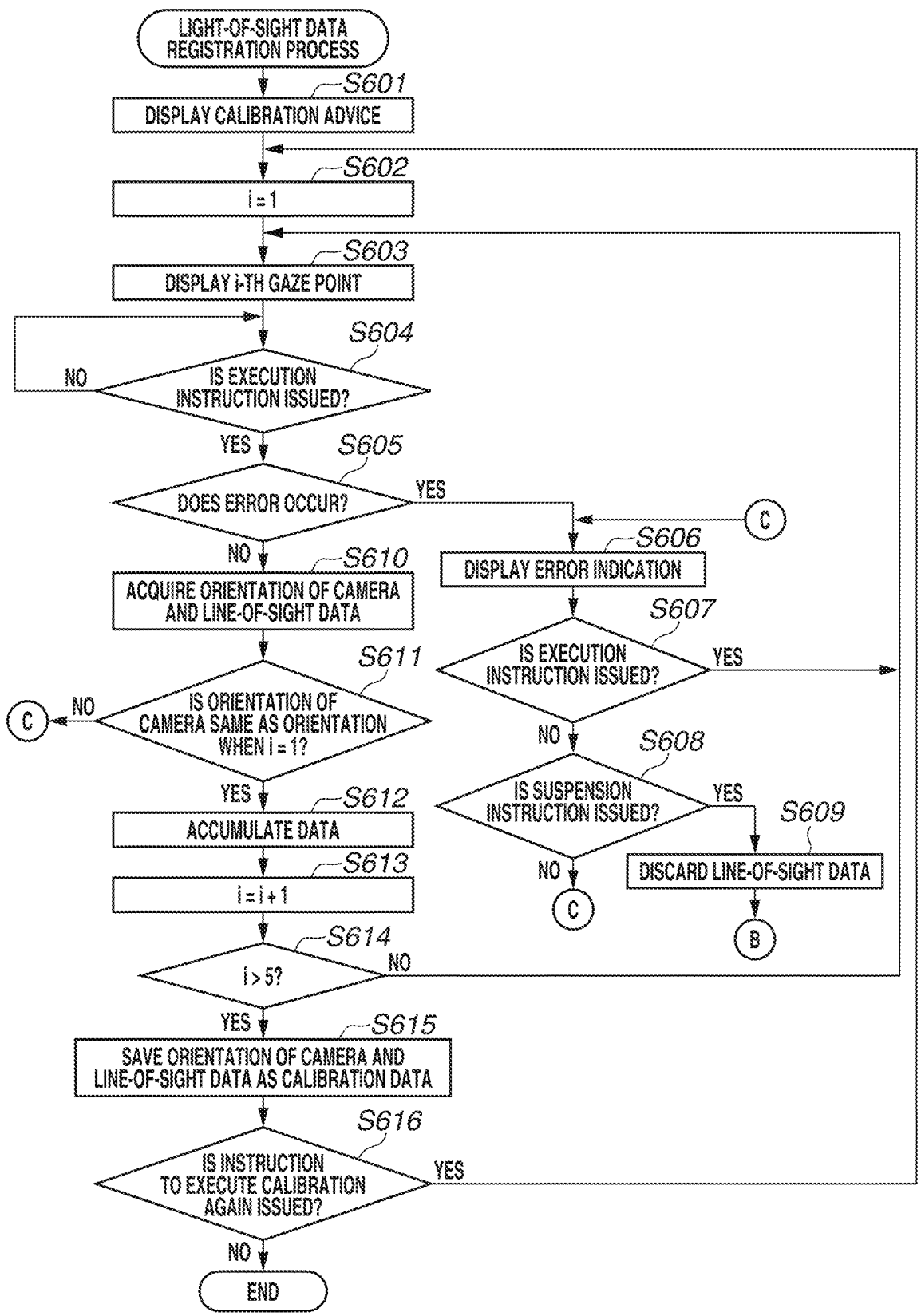
FIG. 6 is a flowchart of a control process regarding a user line-of-sight data registration process in the calibration process regarding a line of sight.

FIG. 6 is a flowchart of a control process which is started when the processing proceeds to step S515 in FIG. 5. This control process is implemented by the system control unit 50 loading a program stored in the non-volatile memory 56 into the system memory 52 and executing the program.

FIGS. 10A-1 to 10E-2 illustrate examples of the display of the gaze points displayed on the EVF 29 in the line-of-sight data registration process in FIG. 6. FIGS. 10A-1, 10B-1, 10C-1, 10D-1, and 10E-1 illustrate examples of display in a case where the viewfinder display format is set to the display 1. FIGS. 10A-2, 10B-2, 10C-2, 10D-2, and 10E-2 illustrate examples of display in a case where the viewfinder display format is set to the display 2. In the present exemplary embodiment, five gaze points are displayed in the effective display region at the center in the up-down and left-right directions, the right in the center in the up-down direction, the left in the center in the up-down direction, the top in the center in the left-right direction, and the bottom in the center in the left-right direction in this order, to acquire pieces of line-of-sight data on the respective gaze points. To perform line-of-sight detection with higher accuracy, pieces of line-of-sight data when the eye 161 of the user is directed in various directions are acquired. Thus, the gaze points are displayed at the above positions in the above order. The present exemplary embodiment, however, is not limited to this. The effective display region in the line-of-sight data registration process is indicated by a gray image, and the gaze points are displayed in a superimposed manner on the effective display region.

In FIGS. 10A-1, 10B-1, 10C-1, 10D-1, and 10E-1 for a case where the viewfinder display format is set to the display 1, the effective display region is set to the entirety of the EVF 29. Thus, the calibration effective display region (the region 720) indicated by the gray image is also similarly set to the entirety of display on the EVF 29. The gaze points are then displayed in a wider region, and pieces of line-of-sight data are acquired. In FIGS. 10A-2, 10B-2, 10C-2, 10D-2, and 10E-2 for a case where the viewfinder display format is set to the display 2, a margin is provided in up, down, left, and right portions, and the calibration effective display region is made one size smaller.

As described above, in a case where the viewfinder display format is set to the display 2, the user may wear glasses. In a case where the effective display region in the display 1 is maintained, and if the user attempts to visually check the LV image in detail including the four corners of the EVF 29, the user is to look in by shifting the position of their eye. In capturing normal images, a major issue does not occur even if the user looks in. However, in acquiring line-of-sight data, the relative position of the line-of-sight detection block 160 and the eye 161 changes. Thus, accurate line-of-sight data cannot be acquired, and the accuracy of calibration data calculated from line-of-sight data may drop. Thus, to prevent the user from looking in with a change in the position, the region 721 is set by making the calibration effective display region one size smaller (about 85% of the effective display region in the display 1). The display positions of the gaze points are displayed such that the relative positions of the gaze points in the effective display region indicated by the gray image are the same.

In step S601, the system control unit 50 displays advice when line-of-sight data is acquired. FIGS. 10A-1 and 10A-2 illustrate examples of display at this time. Advice (a message 907 in FIG. 9D) is displayed on the EVF 29 in a superimposed manner on the effective display region displayed in step S507 or S508 in FIG. 5.

FIGS. 10A-1 and 10A-2 illustrate examples of display in a case where the first gaze point (i=1) is displayed on the EVF 29. A message 913 is displayed together with the first gaze point. If an execution instruction to acquire line-of-sight data is issued (the M-Fn button 83 is pressed) by the user, line-of-sight data at the time when the execution instruction is issued is acquired. The first gaze point and the message 913 are then hidden, and the second gaze point is displayed (the screens transition to FIGS. 10B-1 and 10B-2). The display positions of indicators 1001 and 1011 as the first gaze point are the centers of the regions 720 and 721, respectively, and the message 913 is displayed at the position at which the user can visually check the gaze point.

In the regions 720 and 721, the size of the effective display region is changed in accordance with the setting of the viewfinder display format. However, the display sizes of the indicator 1001, the indicator 1011, and the message 913 are not changed. The indicators 1001 and 1011 as the gaze point are points at which the user is expected to gaze regardless of the setting of the viewfinder display format. Thus, if the sizes of the indicators 1001 and 1011 are reduced, on the contrary, it is difficult to gaze at the indicators 1001 and 1011. Similarly, if the message 913 is displayed in a reduced size, it is difficult to visually check the message 913. Thus, the text of the message 913 is included in the effective display region regardless of whether the viewfinder display format is set to the display 1 or the display 2. For the second and subsequent gaze points, the message 913 is not displayed.

In step S602, the system control unit 50 sets a variable i to one and stores the variable i in the system memory 52. In the present exemplary embodiment, the variable i indicates the place in the display order of the gaze points to be displayed on the EVF 29.

In step S603, the system control unit 50 displays an i-th gaze point on the EVF 29.

As described above, the gaze points are indicators indicating positions at which the user is expected to gaze when the calibration is performed. If i=1, the first gaze point is displayed together with the advice described in step S601 (FIGS. 10A-1 and 10A-2). If i=2 to 5, the advice is not displayed, and only the gaze points are displayed. FIGS. 10A-1, 10B-1, 10C-1, 10D-1, and 10E-1 illustrate examples of display in a case where the system control unit 50 references the non-volatile memory 56, and the viewfinder display format is set to the display 1. FIGS. 10A-2, 10B-2, 10C-2, 10D-2, and 10E-2 illustrate examples of display in a case where the viewfinder display format is set to the display 2.

Figures 1, 10B:
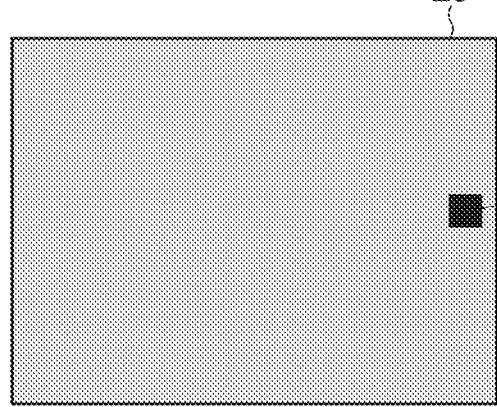
Figures 2, 10B:
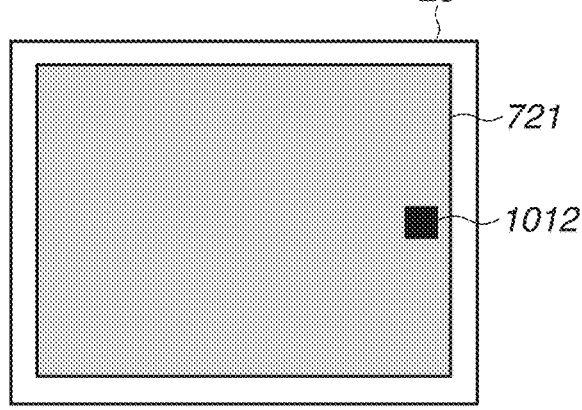
Figures 1, 10C:
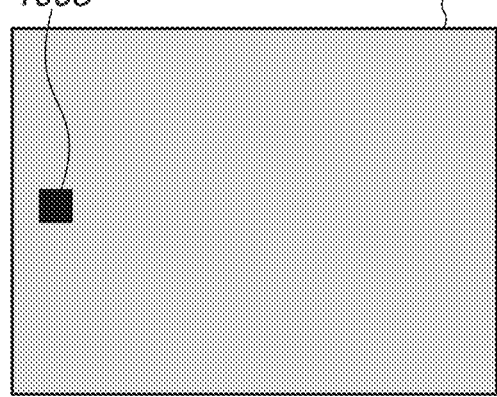
Figures 2, 10C:
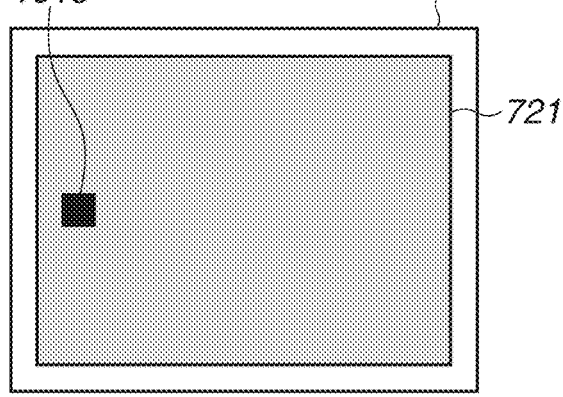
Figures 1, 10D:
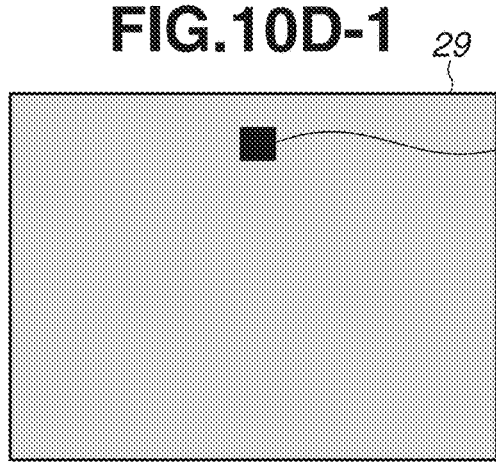
Figures 2, 10D:
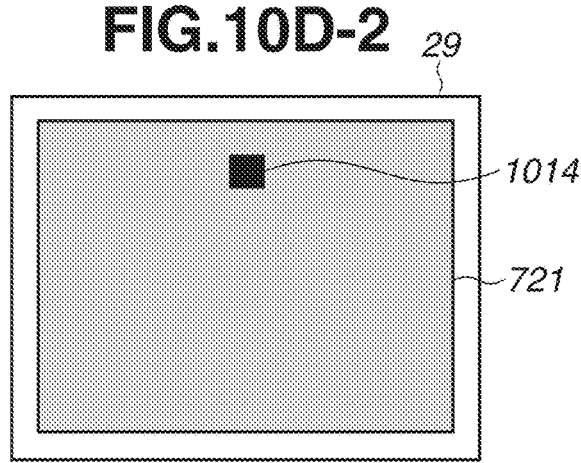
Figures 1, 10E:
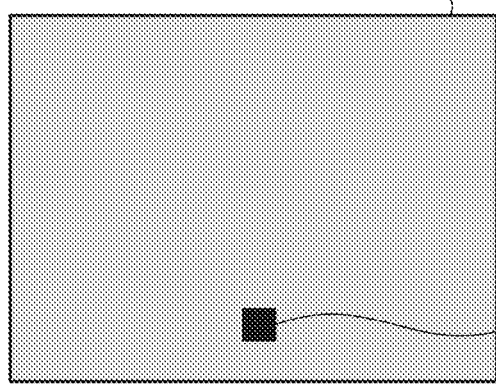
Figures 2, 10E:
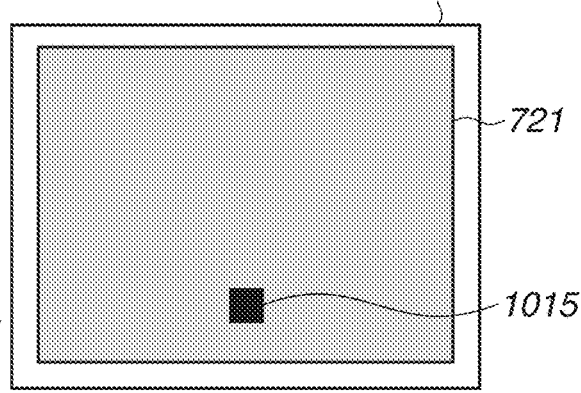

FIGS. 10B-1 and 10B-2 illustrate examples of display in a case where the second gaze point (i=2) is displayed on the EVF 29. As in the case where the first gaze point is displayed, if an execution instruction to acquire line-of-sight data is issued by the user, line-of-sight data at the time when the execution instruction is issued is acquired. The second gaze point is then hidden, and the third gaze point is displayed. From this point onward, similar control is performed also if i=3 to 5. FIGS. 10C-1, 10D-1, and 10E-1 and FIGS. 10C-2, 10D-2, and 10E-2 illustrate examples of display at this time.

In step S604, the system control unit 50 determines whether an execution instruction is issued. If the execution instruction is issued (YES in step S604), the processing proceeds to step S605. If the execution instruction is not issued (NO in step S604), the processing returns to step S604. The execution instruction is issued by an operation on the M-Fn button 83 as illustrated in FIG. 10A-1 or 10A-2. The present exemplary embodiment, however, is not limited to this. As described above, the operation only needs to be performed on an operation member that can be operated without a change in the positional relationship between the line-of-sight detection block 160 and the eye 161 of the user in the state where the user holds the grip portion 90. Even in a case where the execution instruction is not issued, but if the shutter button 61 or the menu button 81 is pressed, the processing proceeds to a corresponding process.

In step S605, the system control unit 50 determines whether an error occurs. If an error occurs (YES in step S605), the processing proceeds to step S606. If no error occurs (NO in step S605), the processing proceeds to step S610. Specific examples of an error in this step include a case where line-of-sight data derived from calibration data set for the current calibration registration number and the currently acquired line-of-sight data are significantly different from each other. This occurs because it is assumed that the user does not wear glasses in the calibration data set with the calibration registration number, but in the currently acquired line-of-sight data, the user wears glasses.

It is determined that an error occurs also in a case where the user separates their eye from the eyepiece portion 16, a case where the user does not correctly place their eye in proximity to the eyepiece portion 16, a case where the user closes their eye by blinking (blinks many times) when line-of-sight data is acquired, a case where outside light is reflected by the eye, and a case where a ghost occurs and covers the lens surface of the glass or the eye of the user. If it is determined that the line-of-sight detection block 160 does not correctly acquire line-of-sight data due to an error as in these cases, it is determined that an error occurs.

Figure 9E:
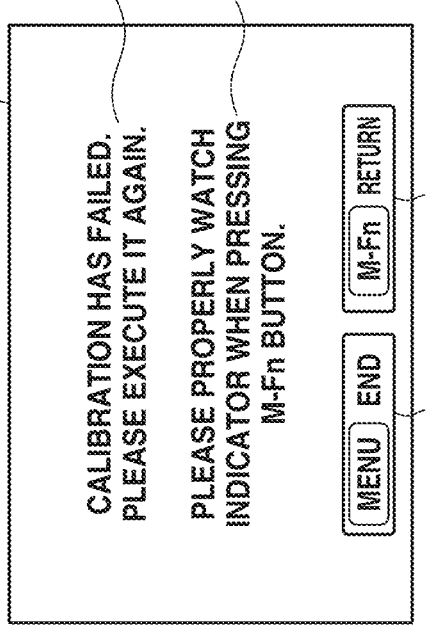
Figure 9F:
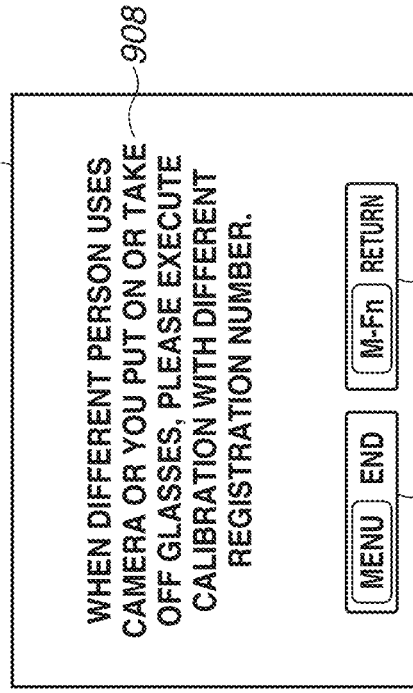

In step S606, the system control unit 50 displays an error indication on the EVF 29. The system control unit 50 displays a message in accordance with the error that has occurred. FIGS. 9E and 9F illustrate examples of display performed on the EVF 29 at this time.

FIG. 9E illustrates an error indication (a message 908) displayed in a case where, as described above in step S605, line-of-sight data derived from calibration data set for the current calibration registration number and the currently acquired line-of-sight data are significantly different from each other.

FIG. 9F illustrates an error indication displayed in a case where the user closes their eye by blinking (blinks many times) when line-of-sight data is acquired, a case where outside light is reflected by the eye, or a case where a ghost occurs and covers the lens surface of the glass or the eye of the user. A message 911 indicates that the acquisition of line-of-sight data has failed due to the occurrence of an error, and a message 912 indicates advice for an instruction to acquire line-of-sight data is issued. In a case where the user separates their eye from the eyepiece portion 16 or does not correctly place their eye in proximity to the eyepiece portion 16, an error indication "Detection of line of sight has failed. Please bring your eye close to viewfinder" is displayed.

In step S607, the system control unit 50 determines whether an execution instruction is issued. If the execution instruction is issued (YES in step S607), the system control unit 50 hides the error indication displayed in step S606, and the processing returns to step S603. If the execution instruction is not issued (NO in step S607), the processing proceeds to step S608. The execution instruction is issued by the selection of a display item 910 in FIG. 9E or 9F.

In step S608, the system control unit 50 determines whether a suspension instruction is issued. If the suspension instruction is issued (YES in step S608), the processing proceeds to step S609. If the suspension instruction is not issued (NO in step S608), the processing returns to step S606. The suspension instruction is issued by the selection of a display item 909 in FIG. 9E or 9F. If no instructions are given in steps S607 and S608, the error indication on the EVF 29 continues. If no instructions are issued by the user, the error indication is not hidden. This control prevents the situation where the acquisition of line-of-sight data continues in the state where the user does not recognize that an error occurs and the error is not solved.

In step S609, the system control unit 50 discards the line-of-sight data acquired in the control flowchart in FIG. 6, and the processing returns to step S302 in FIG. 3A.

In step S610, the system control unit 50 acquires the orientation of the digital camera 100 at the time when the execution instruction is issued and line-of-sight data at the i-th gaze point. The orientation of the digital camera 100 is acquired by the orientation detection unit 55. In the present exemplary embodiment, the orientation of the digital camera 100 is saved in the system memory 52 in this step.

In step S611, the system control unit 50 determines whether the orientation of the digital camera 100 acquired in step S610 is the same as the orientation acquired when i=1 (i.e., when the first gaze point is displayed). If the orientations are the same as each other (YES in step S611), the processing proceeds to step S612. If the orientations are different from each other (NO in step S611), the processing proceeds to step S606. If i=1, this step is skipped. As described above, a plurality of pieces of calibration data (calculated from pieces of line-of-sight data) and the orientation of the camera are set in association with each other. Thus, if the orientation of the digital camera 100 acquired in step S610 is different from the orientation when i=1, the accuracy of calibration data calculated from line-of-sight data decreases, and the accuracy of the line-of-sight input function decreases.

In step S612, the system control unit 50 accumulates the acquired data. The system control unit 50 saves the orientation of the digital camera 100 acquired in step S610 and the line-of-sight data in association with each other in the non-volatile memory 56. Calibration data set for a calibration registration number is saved in association with the orientation of the digital camera 100. This means that, for example, pieces of calibration data for the horizontal and vertical orientations can be set and saved for the registration number "1". A registration number is not assigned to each of the pieces of calibration data for the horizontal and vertical orientations.

Calibration data is saved in association with each orientation, so that it is possible to minimize a shift in a line-of-sight position detected when the orientation changes. For a calibration registration number, the display item 813 in FIG. 8C indicating the presence or absence of the setting of calibration data is not displayed if calibration data for either of the orientations of the digital camera 100 is set. If calibration data is not set, the display item 813 is displayed.

In step S613, the system control unit 50 sets the variable i to i+1 and stores the variable i in the system memory 52.

In step S614, the system control unit 50 references the system memory 52 and determines whether the variable i>Th. If i>Th (YES in step S614), the processing proceeds to step S615. If not (i≤Th) (NO in step S614), the processing returns to step S603. In the present exemplary embodiment, Th is 5. In this step, Th is the number of points for which pieces of data are to be acquired by the calibration. In the present exemplary embodiment, for the five gaze points, pieces of line-of-sight data are acquired, and pieces of calibration data are generated.

In step S615, the system control unit 50 saves the orientation of the digital camera 100 when i=1 and the acquired line-of-sight data in association with each other as calibration data in the non-volatile memory 56.

Figure 9G:
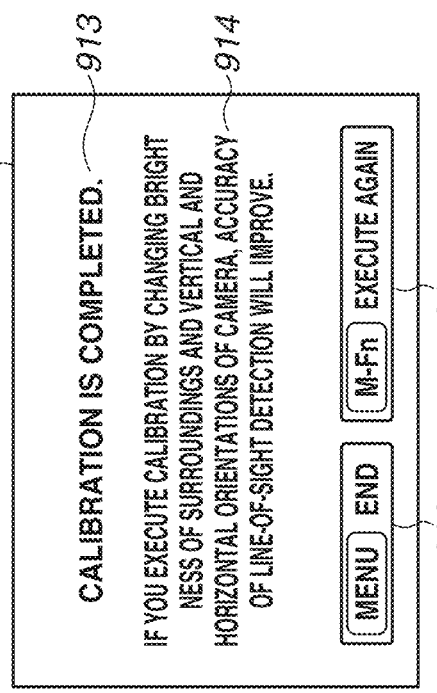

In step S616, the system control unit 50 determines whether an instruction to execute the calibration again has been issued. If the execution instruction has been issued (YES in step S616), the processing returns to step S602. If the execution instruction has not been issued (NO in step S616), the control process flowchart in FIG. 6 ends. FIG. 9O illustrates an example of display at this time. FIG. 9G illustrates a display example to be displayed on the EVF 29 in a case where the acquisition of pieces of line-of-sight data for the five points is completed. A message 913 indicates that the calibration is completed. A message 914 indicates that if the calibration is performed several times, the accuracy of line-of-sight detection will improve. If the display item 909 is selected by the user, the control processing of the flowchart in FIG. 6 ends, and the processing returns to the control flowchart in FIG. 3A. If a display item 915 is selected by the user, the processing returns to step S602, and the line-of-sight data registration process is resumed.

In the present exemplary embodiment, the effective display region in processing the calibration process is determined in accordance with the setting (status) made by the user as described above. When the user views the EVF 29 with their eye in proximity to the eyepiece portion 16, and if the user makes a setting so as to perform display in the entirety of the EVF 29, the effective display region, which is the region where the gaze points are to be displayed in the calibration process, is displayed in the entirety of the EVF 29.

In a case where the user makes a setting so as to perform display in a range smaller than the entirety of the EVF 29, the effective display region in the calibration process is also set to a range smaller than the entirety of the EVF 29. That is, a user who can visually check the entirety of the EVF 29 can set the effective display region to the entirety of the EVF 29. A user who has a narrow field of view in the viewfinder due to the wearing of glasses and having difficulty in visually checking the entirety of the EVF 29 in detail can set the effective display region to a range smaller than the entirety of the EVF 29.

This can prevent the situation where, in acquiring line-of-sight data in the calibration process, a gaze point displayed on the EVF 29 cannot be visually checked, and the positional relationship between the line-of-sight detection block 160 and the eye 161 is changed. In other words, it is possible to reduce a decrease in the accuracy of line-of-sight data due to a change in the positional relationship between the line-of-sight detection block 160 and the eye 161. Reduction of decrease in the accuracy of line-of-sight data minimizes a shift between a position viewed by the user and a detected line-of-sight position in using the line-of-sight input function by the user, thus preventing the user from feeling inconvenience. In the present exemplary embodiment, it is possible to display gaze points (described below) at positions at which the eye 161 of the user is moved largely wherever possible in a range that can be visually checked by the user, and acquire pieces of line-of-sight data for these positions. Thus, it is possible to calculate calibration data with higher accuracy and provide a line-of-sight input with higher accuracy.

In the present exemplary embodiment, an indicator which is displayed on the EVF 29 and at which the user is expected to gaze is referred to as a "gaze point". To be exact, however, the indicator is not a point or one dot of liquid crystal of a display unit, and has a certain size and a certain area as illustrated in FIGS. 10A-1 to 10E-2. As illustrated in FIGS. 10A-1 to 10E-2, the display form of each gaze point is a form in which the gaze point is rectangular and filled. Alternatively, even with animation display in which a rectangular indicator rotates until the user gives an execution instruction to acquire line-of-sight data, the present exemplary embodiment is not affected at all. The animation display makes it easier for the user to gaze at the indicator. The display positions, the display order, the display forms, and the display sizes (areas) of the gaze points are not limited to these. Instead of rectangular, the gaze points may be triangular, circular, or star-shaped.

In the present exemplary embodiment, no matter which process is controlled, if the menu button 81 is pressed, the menu mode process is performed. If the shutter button 61 is pressed, the image capturing mode process is performed. If the reproduction button 79 is pressed, an image saved in the recording medium 200 is reproduced. If the power switch 72 is operated, the digital camera 100 is powered off.

The various types of control that is performed by the system control unit 50 in the above description may be performed by a single hardware device, or the processing may be shared by a plurality of hardware devices (e.g., a plurality of processors or circuits) to control the entirety of the apparatus.

While the present exemplary embodiment has been described in detail based on its suitable exemplary embodiments, the present exemplary embodiment is not limited to these specific exemplary embodiments. The present exemplary embodiment also includes various forms without departing from the spirit and scope of the disclosure. A description has been provided as an example of the touch panel 70a which serves as an instruction member for position movement used in combination with a line-of-sight input. Alternatively, another operation unit, such as a button and a dial, may be used. In the present exemplary embodiment, the display position is the AF frame. Alternatively, an icon frame or a parameter setting frame may be used, or an indicator different from a line-of-sight gaze frame, such as a mouse pointer, may be displayed. In the present exemplary embodiment, a criterion for determining a gaze is the time accumulated after a line-of-sight input to the line-of-sight detection block 160 starts. Alternatively, this accumulated time may be a time set in advance. The accumulated time may change in accordance with the positional relationship between the displayed line-of-sight gaze frame and a line-of-sight position, or may be freely set by the user. In the present exemplary embodiment, a gaze is used as an example of a criterion for determining a line-of-sight position intended by the user. Alternatively, a gaze may not be used as the criterion for the determination.

In the above exemplary embodiments, a description has been provided of an example a case where the present exemplary embodiment is applied to a camera. The present exemplary embodiment, however, is not limited to this example, and is applicable to any display control apparatus including a reception unit capable of receiving a line-of-sight input and an eyepiece portion. The exemplary embodiments can also be appropriately combined together. In the present exemplary embodiment, a configuration is employed in which the EVF 29 and line-of-sight detection are used. Alternatively, the present exemplary embodiment can be carried out also with a configuration in which a display device such as a head-mounted display and line-of-sight detection are used. In other words, the present exemplary embodiment is applicable to a personal computer, a personal digital assistant (PDA), a mobile phone terminal, a mobile image viewer, a printer apparatus including a display, a digital photo frame, a music player, a game apparatus, an electronic book reader, and a wearable device such as a head-mounted display.

The present exemplary embodiment is applicable not only to an imaging apparatus main body but also to a control apparatus that communicates with an imaging apparatus (including a network camera) through wired or wireless communication and remotely controls the imaging apparatus. Examples of the apparatus that remotely controls the imaging apparatus include apparatuses such as a smartphone, a tablet personal computer (PC), and a desktop PC.

The control apparatus transmits commands to perform various operations and make various settings to the imaging apparatus based on operations performed in the control apparatus or based on processes performed in the control apparatus, thus remotely controlling the imaging apparatus. The control apparatus may be able to receive a live view image captured by the imaging apparatus through wired or wireless communication and display the live view image.

Other Exemplary Embodiments

The present exemplary embodiment can be implemented also by performing the following process: the process of supplying software (a program) for achieving the functions of the above exemplary embodiments to a system or an apparatus via a network or various storage media, and of causing a computer (or a central processing unit (CPU) or a microprocessor unit (MPU)) of the system or the apparatus to read and execute a program code. In this case, the program and a storage medium that stores the program constitute the present exemplary embodiment.

According to the present exemplary embodiment, a user can appropriately visually check an effective display region and a display element displayed in the effective display region.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-027612, filed Feb. 24, 2021, which is hereby incorporated by reference herein in its entirety.

What is claimed is:

1. A display control apparatus comprising:
an imaging sensor;
at least one memory and at least one processor which function as:
an acquisition unit configured to acquire information regarding a line of sight of a user toward a display visually checked by the user through a viewfinder; and
a setting unit configured to set a display setting from among a plurality of display settings including a first display setting in which an effective display region for displaying a live image captured by the imaging sensor in a display screen of the display is a display region in a first size and a second display setting in which the effective display region is a display region in a second size smaller than the first size, and
a control unit configured to perform control so that the live image captured by the image sensor is displayed in an effective display region in accordance with the display setting set by the setting unit,
wherein, when calibration for the information regarding the line of sight is executed, the control unit performs control so that a display element for the calibration and an image indicating the effective display region in accordance with the display setting set by the setting unit are displayed on the display.

2. The display control apparatus according to claim 1, wherein the control unit performs control so that an image enabling the user to visually check an outer periphery of the effective display region is displayed as the image indicating the effective display region.

3. The display control apparatus according to claim 1, wherein the control unit performs control so that a rectangle indicating the effective display region is displayed as the image indicating the effective display region.

4. The display control apparatus according to claim 1, wherein the control unit performs control so that indicators at four corners of the effective display region are displayed as the image indicating the effective display region.

5. The display control apparatus according to claim 1, wherein the control unit performs control so that the effective display region which is filled with a particular color is displayed as the image indicating the effective display region.

6. The display control apparatus according to claim 5, wherein the particular color is gray.

7. The display control apparatus according to claim 5, wherein the particular color is a color specified by red, green, and blue (RGB) values of 119, 119, and 119.

8. The display control apparatus according to claim 1, wherein the second size is 85% of the first size.

9. The display control apparatus according to claim 1, wherein the display region in the first size is an entirety of a region displayable on the display.

10. The display control apparatus according to claim 1, wherein the control unit performs control so that the display element for the user to gaze at in executing the calibration is displayed in the effective display region.

11. The display control apparatus according to claim 1, wherein the control unit performs control so that the acquiring of the information regarding the line of sight of the user by the acquisition unit is started in response to the user issuing an execution instruction to execute the calibration, and that in response to an issuance of the execution instruction, information displayed before the execution instruction is issued is hidden and the image and the display element are displayed.

12. The display control apparatus according to claim 1, wherein the control unit performs control so that the acquiring of the information regarding the line of sight of the user by the acquisition unit is started in response to the user issuing an execution instruction to execute the calibration, and that the display element indicating a gaze point is displayed in the effective display region in response to an issuance of the execution instruction.

13. The display control apparatus according to claim 1, wherein the display control apparatus further comprising:
   a viewfinder through which the user visually checks the display; and
   an approach detector configured to detect approach of a physical body to the viewfinder,
   wherein the control unit performs control so that, in a case where a physical body has approached the approach detector, the live image captured by the image sensor unit is displayed in the effective display region in accordance with the display setting set by the setting unit, and that, in a case where a physical body does not approach the approach detector, the live image is displayed in an entirety of a second display which is different from the display arranged outside the viewfinder, regardless of the display setting set by the setting unit.

14. A control method for a display control apparatus, the control method comprising:
   acquiring information regarding a line of sight of a user toward a display unit visually checked by the user through a viewfinder; and
   setting a display setting from among a plurality of display settings including a first display setting in which an effective display region for displaying a live image captured by the imaging sensor in a display screen of the display is a display region in a first size and a second display setting in which the effective display region is a display region in a second size smaller than the first size, and
   performing control so that the live image captured by the image sensor is displayed in an effective display region in accordance with the display setting set by the setting unit,
   wherein, when calibration for the information regarding the line of sight is executed, the control unit performs control so that a display element for the calibration and an image indicating the effective display region in accordance with the display setting set by the setting unit are displayed on the display.

15. A non-transitory computer-readable storage medium storing a program that, when executed by a computer, causes the computer to perform a control method for a display control apparatus, the method comprising:
   acquiring information regarding a line of sight of a user toward a display unit visually checked by the user through a viewfinder; and
   setting a display setting from among a plurality of display settings including a first display setting in which an effective display region for displaying a live image captured by the imaging sensor in a display screen of the display is a display region in a first size and a second display setting in which the effective display region is a display region in a second size smaller than the first size, and
   performing control so that the live image captured by the image sensor is displayed in an effective display region in accordance with the display setting set by the setting unit,
   wherein, when calibration for the information regarding the line of sight is executed, the control unit performs control so that a display element for the calibration and an image indicating the effective display region in accordance with the display setting set by the setting unit are displayed on the display.

\* \* \* \* \*